US012382212B2

(12) United States Patent
Cao et al.

(10) Patent No.: US 12,382,212 B2
(45) Date of Patent: Aug. 5, 2025

(54) BONE CONDUCTION ACOUSTIC DEVICE, METHOD FOR ASSEMBLING BONE CONDUCTION ACOUSTIC DEVICE AND BONE CONDUCTION EARPHONE

(71) Applicant: Suzhou Thor Electronic Technology Co., Ltd., Jiangsu (CN)

(72) Inventors: Hongbin Cao, Jiangsu (CN); Jialong Shen, Jiangsu (CN); Juan Chen, Jiangsu (CN)

(73) Assignee: Suzhou Thor Electronic Technology Co., Ltd., Jiangsu (CN)

( * ) Notice: Subject to any disclaimer, the term of this patent is extended or adjusted under 35 U.S.C. 154(b) by 227 days.

(21) Appl. No.: 17/944,168

(22) Filed: Sep. 13, 2022

(65) Prior Publication Data

US 2023/0100866 A1 Mar. 30, 2023

(30) Foreign Application Priority Data

Sep. 18, 2021 (CN) .......................... 202111101481.1

(51) Int. Cl.

| | |
|---|---|
| ***H04R 1/10*** | (2006.01) |
| ***H04R 1/02*** | (2006.01) |
| ***H04R 9/02*** | (2006.01) |
| ***H04R 31/00*** | (2006.01) |

(52) U.S. Cl.

CPC ............. *H04R 1/1091* (2013.01); *H04R 1/02* (2013.01); *H04R 9/025* (2013.01); *H04R 31/00* (2013.01); *H04R 2460/13* (2013.01)

(58) Field of Classification Search

CPC ........ H04R 1/1091; H04R 1/02; H04R 9/025; H04R 31/00; H04R 2460/13

(Continued)

(56) References Cited

U.S. PATENT DOCUMENTS

2010/0316235 A1 12/2010 Park et al.
2012/0020501 A1* 1/2012 Lee ...................... H04R 1/1016 381/151

(Continued)

FOREIGN PATENT DOCUMENTS

CN 207978118 10/2018
CN 109511043 3/2019

(Continued)

*Primary Examiner* — Sean H Nguyen
(74) *Attorney, Agent, or Firm* — JCIPRNET

(57) ABSTRACT

The application discloses a bone conduction acoustic device, a method for assembling bone conduction acoustic device and a bone conduction earphone. The bone conduction acoustic device includes: a case, which includes a base case portion and a side case portion connected with the base case portion, a cavity with an opening at one end is formed between the base case portion and the side case portion; a cover connected to the side case portion and sealing the opening; the magnet assembly connected to the cover and located in the cavity; a voice coil assembly arranged in the cavity, and voice coil assembly part is arranged opposite to the magnet assembly part for driving the magnetic assembly to vibrate; and a circuit board arranged in the cavity and electrically connected to the voice coil assembly, the circuit board is located between the base case portion and the voice coil assembly. When the bone conduction acoustic device of the present application is installed, it is only necessary to install the circuit board and the voice coil assembly in the housing first, and then install the cover connected with the magnet assembly to the housing to complete the installation. The overall structure is simpler and more compact, and the assembly is more convenient.

22 Claims, 20 Drawing Sheets

(58) Field of Classification Search
USPC .......................................................... 381/151
See application file for complete search history.

(56) References Cited

U.S. PATENT DOCUMENTS

| | | | | |
|---|---|---|---|---|
| 2013/0083940 | A1 | 4/2013 | Hwang | |
| 2013/0308798 | A1 * | 11/2013 | Lee | H04R 9/02<br>381/151 |
| 2016/0021452 | A1 * | 1/2016 | Tang | H04R 11/00<br>381/151 |
| 2020/0296526 | A1 * | 9/2020 | Kim | H04R 25/606 |

FOREIGN PATENT DOCUMENTS

| | | | |
|---|---|---|---|
| CN | 209267765 | | 8/2019 |
| CN | 110278514 | A | 9/2019 |
| CN | 110708646 | | 1/2020 |
| CN | 210469730 | | 5/2020 |
| CN | 210868165 | | 6/2020 |
| CN | 110278514 | B | 10/2020 |
| CN | 111988696 | | 11/2020 |
| CN | 112367596 | | 2/2021 |
| CN | 212572925 | | 2/2021 |
| CN | 212785792 | | 3/2021 |
| CN | 112887870 | | 6/2021 |
| CN | 113271513 | | 8/2021 |
| CN | 214381340 | | 10/2021 |
| CN | 215379199 | | 12/2021 |
| CN | 215835547 | | 2/2022 |
| KR | 20110129507 | | 12/2011 |
| WO | 2011149282 | | 12/2011 |
| WO | 2021063113 | | 4/2021 |

* cited by examiner

BONE CONDUCTION ACOUSTIC DEVICE, METHOD FOR ASSEMBLING BONE CONDUCTION ACOUSTIC DEVICE AND BONE CONDUCTION EARPHONE

CROSS-REFERENCE TO RELATED APPLICATION

This application claims the priority benefit of China application serial no. 202111101481.1, filed on Sep. 18, 2021. The entirety of the above-mentioned patent application is hereby incorporated by reference herein and made a part of this specification.

BACKGROUND

Technical Field

The application relates to the technical field of loudspeakers, in particular to a bone conduction acoustic device, a method for assembling bone conduction acoustic device and a bone conduction earphone.

Description of Related Art

Bone conduction earphone is a kind of earphone made by using bone conduction sound transmission way, and comprises a bone conduction acoustic device for generating sound. Compared with the traditional way of transmitting sound through sound waves, the bone conduction sound transmission way directly transmits vibration to the auditory nerve through the bones, eliminating many steps of sound wave transmission. Therefore, both ears may be released without damaging the eardrum, and a clear sound reproduction can be achieved in a noisy environment. Moreover, the sound waves will not affect others due to the diffusion in the air, and therefore it is loved by the majority of consumers.

The bone conduction acoustic device is the vibration and sound transmission part of the bone conduction earphone, and has many parts. Since bone conduction earphones usually need to be worn on the user's ears, for the convenience of use and carrying, the bone conduction acoustic device must have a small volume and not be too bulky. However, the miniaturization of bone conduction acoustic device will limit the installation of its internal components, resulting in inconvenient installation.

Therefore, it is necessary to improve the prior art to overcome the defects in the prior art.

SUMMARY

The purpose of the present application is to provide a bone conduction acoustic device, which is more convenient to install; in addition, the present application also provides a method for assembling the bone conduction acoustic device and a bone conduction earphone with the bone conduction acoustic device.

In order to achieve the above-mentioned purpose of the application, in the first aspect, the present application proposes a bone conduction acoustic device, comprising:

a case, including a base case portion and a side case portion connected with the base case portion, a cavity with an opening at one end is formed between the base case portion and the side case portion;

a cover, connected to the side case portion and sealing the opening;

a magnet assembly, connected to the cover, and located in the cavity;

a voice coil assembly, arranged in the cavity, and arranged opposite to the magnet assembly for driving the magnet assembly to vibrate; and a circuit board, arranged in the cavity, and electrically connected to the voice coil assembly, the circuit board is located between the base case portion and the voice coil assembly.

Further the voice coil assembly comprise a coil, a first magnetically conductive part and a first magnetic part, and the coil and the first magnetic part are both connected to a side of the first magnetically conductive part close to the magnet assembly;

the magnet assembly includes a flexure spring connected with the cover, a second magnetically conductive part connected with the flexure spring, and a second magnetic part connected to a side of the second magnetically conductive part close to the voice coil assembly;

the coil generates an electromagnetic field with a changing polarity after being energized, the electromagnetic field can generate a varying attractive force and a repulsive force on the second magnetic part, the second magnetic part drives the flexure spring to vibrate back and forth under the attractive force and the repulsive force Further, the first magnetic part and the second magnetic part are arranged opposite to each other in the same pole, and there is a first attractive force between the first magnetic part and the second magnetically conductive part, and there is a second attractive force between the second magnetic part and the first magnetically conductive part; when the coil is not energized, the resultant force of the first attractive force and the second attractive force is equal to the repulsive force between the first magnetic part and the second magnetic part.

Further, the coil is ring-shaped, and the first magnetic part is disposed in the central hole of the coil;

and the gap between the outer peripheral surface of the first magnetic part and the central hole is greater than 0.05 mm, and the height of the first magnetic part is not higher than the height of the coil.

Further, both the first magnetically conductive part and the second magnetically conductive part are plate-shaped; or, each of the first and second magnetically conductive parts includes a plate portion and a ring portion protruding from the plate portion; or, one of the first magnetically conductive part and the second magnetically conductive part is plate-shaped, and the other includes a plate portion and a ring portion protruding from the plate portion.

Further, the first magnetic conductive part is provided with an avoidance slot or an avoidance hole for the lead wire of the coil to pass through.

Further, the flexure spring includes a body, an outer ring body surrounding the body, and a plurality of connecting arms connected between the body and the outer ring body, the outer ring body is connected to the cover, and the body is connected with the second magnetically conductive part;

Further, the connecting arm is suspended in the air and is not in contact with the second magnetically conductive part;

Further, the magnet assembly further includes a low-frequency adjustment plate connected between the body and the second magnetically conductive part, and the low-frequency adjustment plate is not in contact with the connecting arm.

Further, the cover is provided with an avoidance hole for avoiding the movement of the main body and the connecting arm.

Further, the cover includes a connecting surface connected to the outer ring body, one of the connecting surface and the outer ring body is provided with a convex positioning block, and the other is provided with a positioning slot or a positioning hole mated with the positioning block.

Further, the side case portion is provided with a wiring hole connected with the cavity, and the circuit board is electrically connected to an external circuit through the wiring of the wiring hole.

Further, the case further includes a support seat connected with the side case portion, the support seat is provided with a position limiting groove, and the flexure spring is partially fit to the position limiting groove.

Further, the case further includes a reinforcing rib connected between the support seat, and the base case portion and/or the side case portion;

the number of the reinforcing ribs is one; or, the number of the reinforcement ribs is multiple, and the multiple reinforcement ribs are arranged at intervals.

Further, the case further includes a supporting boss located in the cavity, and the first magnetically conductive part is mounted on the supporting boss, and an installation space for accommodating the circuit board is formed between the first magnetically conductive part and the base case portion.

Further, the surface of the cover in contact with the user's body has a normal line A; the angle between the vibration axis B of the magnet assembly and the normal line A is any value between 0° and 35°;

Further, the angle is any value between 0° and 10°.

Further, the cover includes a flexible layer for contact with the user's skin, the thickness of the flexible layer is 0.2~1 mm;

Further, the thickness of the flexible layer is 0.3~0.6 mm.

Further, the thickness of the flexible layer is 0.4~0.5 mm.

Further, the Young's modulus of the case and the cover is ≥2 GPa.

Further, the Young's modulus of the case and the cover is any value between 8 GPa and 25 GPa.

Further, the circuit board includes a first microphone for receiving the user's voice and a second microphone for receiving ambient sound; the case is provided with a first microphone hole corresponding to the first microphone and a second microphone hole corresponding to the second microphone.

Further, the distance between the center of the first microphone hole and the center of the second microphone hole is not less than 15 mm.

Further, the angle between the positive direction of the axis of the first microphone hole and the second microphone hole is not less than 70°;

Further, the angle between the positive direction of the axis of the first microphone hole and the second microphone hole is not less than 90°.

Further, the positive directions of the axes of the first microphone hole and the second microphone hole are not blocked by the auricle;

Further, the bone conduction acoustic device further includes a first waterproof and breathable membrane and a second waterproof and breathable membrane, the first waterproof and breathable membrane seals the first microphone hole, and the second waterproof and breathable membrane seals the second microphone hole.

Further, the bone conduction acoustic device includes a button assembly that includes a switch provided on the circuit board and a pressing panel connected to the outer surface of the case for pressing to trigger the switch.

Further, the button assembly includes a base connected to the case and a pressing part connected to the base, one end of the pressing part is connected to the base and the other end is suspended, the pressing portion includes a protrusion corresponding to the switch position and bump toward the switch, and the case is provided with an avoidance through hole corresponding to the switch position.

Further, the button assembly further includes a flexible pad that seals the avoidance through hole and a pressing part located between the flexible pad and the switch.

In the second aspect, the present application provides a bone conduction earphone, including the bone conduction acoustic device described in any one of the above.

In the third aspect, the present application also provides a method for assembling bone conduction acoustic device, which is used for assembling the bone conduction acoustic device as described above. The method for assembling the bone conduction acoustic device includes the following steps:

installing the circuit board into the case;

installing the voice coil assembly in the case, and electrically connect the coil with the circuit board;

installing the magnet assembly on the cover;

installing the cover on the case.

In the fourth aspect, the present application also provides a method for assembling bone conduction acoustic device, which is used for assembling the bone conduction acoustic device as described above. The method for assembling the bone conduction acoustic device includes the following steps:

attaching the first waterproof and breathable membrane and the second waterproof and breathable membrane to positions in the case corresponding to the first microphone hole and the second microphone hole;

installing the circuit board into the case, and aligning the first microphone and the second microphone to the first microphone hole and the second microphone hole, respectively;

installing the voice coil assembly in the case, and electrically connecting its coil with the circuit board;

installing the magnet assembly on the cover;

installing the cover on the case.

In the fifth aspect, the present application also provides a method for assembling bone conduction acoustic device, which is used for assembling the bone conduction acoustic device as described above. The method for assembling the bone conduction acoustic device includes the following steps:

installing the flexible pad connected with the pressing part to the case;

installing the pressing panel on the case;

installing the circuit board into the case;

installing the voice coil assembly in the case, and electrically connecting its coil with the circuit board;

installing the magnet assembly on the cover;

installing the cover on the case.

Compared with the prior art, the present application has the following beneficial effects: by setting the magnet assembly to be connected to the cover and the voice coil assembly to be connected to the case, when the bone conduction acoustic device of the present application is installed, it is only necessary to install the circuit board and the voice coil assembly in the housing first, and then install the cover connected with the magnet assembly to the housing to complete the installation. The overall structure is simpler and more compact, assembly is more convenient.

DESCRIPTION OF THE EMBODIMENTS

Figure 1:
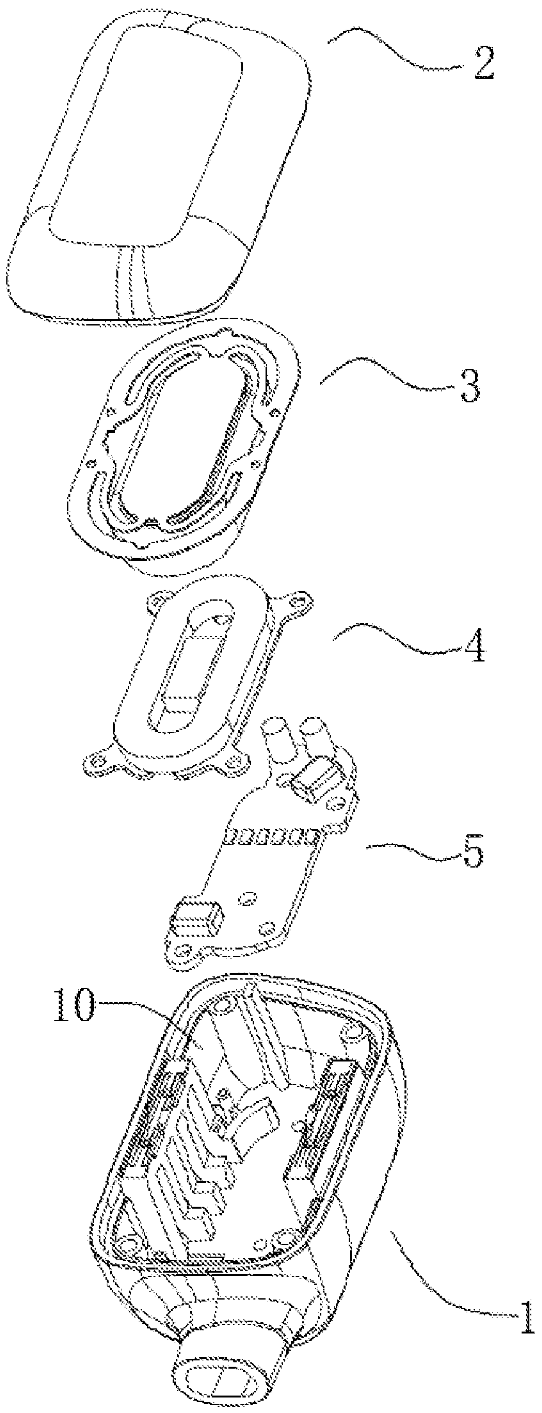
FIG. 1 is an exploded schematic diagram of a bone conduction acoustic device according to an embodiment of the present application.

In order to make the above objectives, features, and advantages of the present application more obvious and understandable, the specific implementation manners of the present application will be described in detail below with reference to the drawings. It can be understood that the specific embodiments described herein are only used to explain the application, but not to limit the application. In addition, it should be noted that, for ease of description, the drawings only show parts of the structures related to the present application, but not all of the structures. Based on the embodiments in this application, all other embodiments obtained by those of ordinary skill in the art without creative work shall fall within the protection scope of this application.

The terms "including" and "having" and any variations of them in this application are intended to cover non-exclusive inclusions. For example, a process, method, system, product, or device that includes a series of steps or units is not limited to the listed steps or units, but optionally includes unlisted steps or units, or optionally also includes other steps or units inherent in these processes, methods, products or devices.

Reference to "embodiments" herein means that a specific feature, structure, or characteristic described in conjunction with the embodiments may be included in at least one embodiment of the present application. The appearance of the phrase in various places in the specification does not necessarily refer to the same embodiment, nor is it an independent or alternative embodiment mutually exclusive with other embodiments. Those skilled in the art clearly and implicitly understand that the embodiments described herein can be combined with other embodiments.

As shown in FIGS. 1 to 20, a bone conduction acoustic device corresponding to a preferred embodiment of the present application includes a case 1, a cover 2 connected to the case 1, and a magnet assembly 3, voice coil assembly 4 and circuit board 5 which are all arranged between the case 1 and the cover 2.

Figure 2:
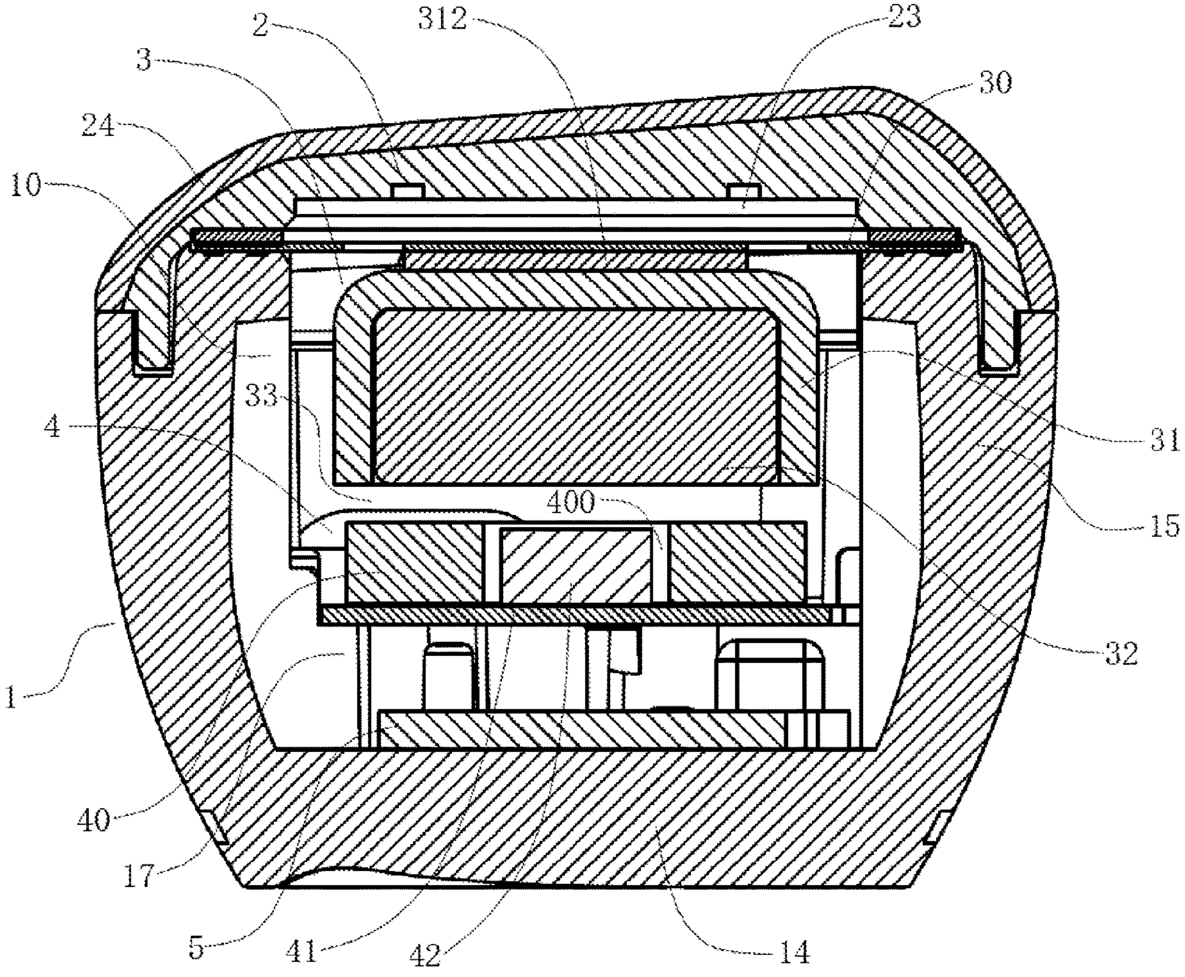
FIG. 2 is schematic cross-sectional view of a bone conduction acoustic device according to an embodiment of the present application.

Among them, as shown in FIG. 2, the case 1 comprises a base case portion 14 and a ring-shaped side case portion 15 protruding outward from the outer edge of the base case portion 14. A cavity 10 is formed between the base case portion 14 and the side case portion 15, which is used to accommodate the magnet assembly 3, the voice coil assembly 4, and the circuit board 5. The cavity 10 has an opening at one end away from the base case portion 14 to facilitate the installation of the magnet assembly 3, the voice coil assembly 4 and the circuit board 5.

The cover 2 is connected with the side case portion 15 of the case 1 and is located at the opening end of the cavity 10. After the cover 2 is connected with the case 1, it seals the opening.

The connection method between the cover 2 and the case 1 is not limited. In the embodiment, the cover 2 and the side case portion 15 are fixed by gluing. Specifically, referring to FIGS. 3 and 4, the cover 2 is provided with a convex annular boss 22. The end of the side case 15 is provided with a recessed annular groove 150. The annular boss 22 is mated with the annular groove 150 and can be inserted into the annular groove 150. The annular groove 150 is provided with glue, so that the cover 2 can be reliably connected with the side case portion 15. Preferably, there is a gap between the annular groove 150 and the annular boss 22, so that there is a sufficient amount of glue between them, and the connection is stronger. The case 1 is also provided with a first positioning hole 151, and the cover 2 is provided with a first positioning post 26 corresponding to the first positioning hole 151. The first positioning post 26 is mated with the first positioning hole 151. During installation, the first positioning hole 151 and the first positioning post 26 can cooperate to guide the cover 2 to be installed on the case 1. The first positioning hole 151 and the first positioning post 26 can also improve the assembly accuracy of the case 1 and the cover 2, and improve the connection strength after installation. The number of the first positioning posts 26 is not limited. In the embodiment, the number is four, and correspondingly, the number of the first positioning holes 151 is also four.

The magnet assembly 3 and the voice coil assembly 4 are arranged opposite to each other in the cavity 10, wherein the magnet assembly 3 is connected to the cover 2, and the voice coil assembly 4 is connected to the case 1 and is closer to the base case portion 14 than the magnet assembly 3. The connection manner between the magnet assembly 3 and the cover 2 and the connection manner between the voice coil assembly 4 and the case 1 may both be for example, adhesive connection manner. As shown in FIG. 2, the voice coil assembly 4 is used to drive the magnet assembly 3 to vibrate. The voice coil assembly 4 is electrically connected to the circuit board 5 and powered by the circuit board 5. The circuit board 5 can control the magnet assembly 3 to generate vibrations of different amplitudes and frequencies by controlling the magnitude, direction and other parameters of the current input into the voice coil assembly 4. The cover 1 when contacting the human face, may enable people to receive different sounds through solid sound transmission.

Obviously, in order not to affect the vibration of the magnet assembly 3, there is a space 33 between the magnet assembly 3 and the voice coil assembly 4.

The circuit board 5 is preferably arranged at the bottom of the cavity 10 (the bottom of the cavity 10 refers to the end close to the base case portion 14) and is located between the base case portion 14 and the voice coil assembly 4. This arrangement can make full use of the internal space of the case 1, and the circuit board 5 and the voice coil assembly 4 can be installed in sequence, so that the installation is more convenient. In this embodiment, the case 1 is also provided with a wiring hole 11 communicating with the cavity 10, and wires can be routed through the wiring hole 11 to electrically connect the circuit board 5 to an external circuit. For example, it can be electrically connected to the power supply, control board, etc. so as to supply power to the voice coil assembly 4, and to change the parameters such as current and voltage input to the voice coil assembly 4 according to the control signal. It is not required to arrange the components such as the control board and the power supply in the cavity 10, so the volume of the bone conduction acoustic device can be greatly reduced, to facilitate the installation of internal components.

It can be understood that, in the bone conduction acoustic device of the present application, the magnet assembly 3 is connected to the cover 2 as a whole, and the voice coil assembly 4 is connected to the case 1 as a whole. Therefore, during installation, the circuit board 5 and the voice coil assembly 4 can be installed in the case 1 first, and then the cover 2 with the magnet assembly 3 may be installed on the case 1 to complete the installation of the bone conduction acoustic device. Installation is very convenient. In addition, both the magnet assembly 3 and the voice coil assembly 4 can be assembled outside the case 1, and connected to the cover 2 or the case 1, and both of them are assembled in an open environment, therefore their installation is also very convenient.

Figure 5:
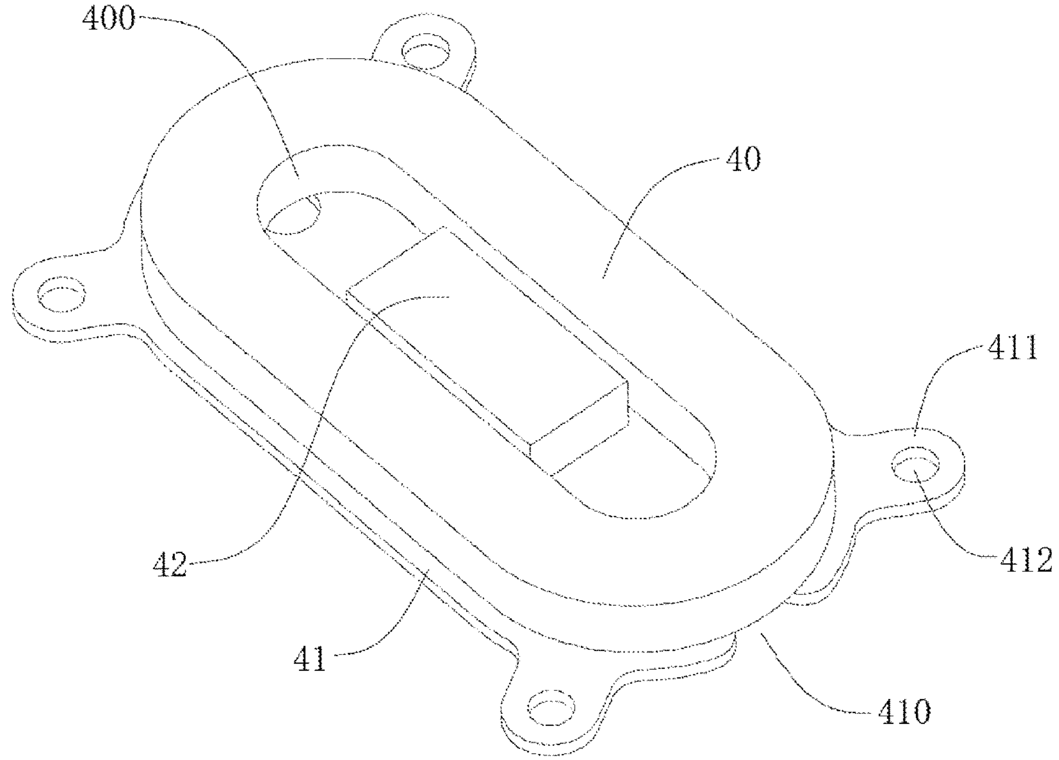
FIG. 5 is a schematic structural diagram of a voice coil assembly according to an embodiment of the present application.
Figure 6:
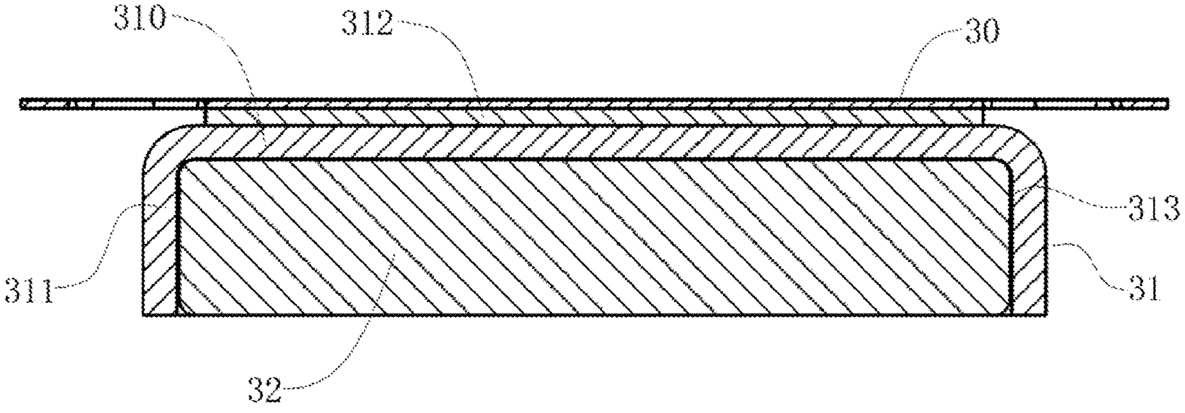
FIG. 6 is a schematic cross-sectional view of a magnet assembly according to an embodiment of the present application.

As a preferred embodiment, in this embodiment, as shown in FIGS. 5, the voice coil assembly 4 includes a coil 40, a first magnetically conductive part 41 and a first magnetic part 42. Both the first magnetic part 42 and the coil 40 are connected to the first magnetically conductive part 41, and are connected to the side of the first magnetically conductive part 41 close to the magnet assembly 3. The connection between the first magnetic part 42 and the coil 40 as well as the first magnetically conductive part 41 is not limited. For example, it may be adhesive connection. As shown in FIG. 6, the magnet assembly 3 includes a flexure spring 30 connected to the cover 2, a second magnetically conductive part 31 connected to the flexure spring 30, and the second magnetic part 32 connected to one side of the second magnetically conductive part 31 close to the voice coil assembly 4. The flexure spring 30 and the second magnetically conductive part 31 together with the second magnetic part 32 and the second magnetically conductive part 31 can also be connected by glue. Since the flexure spring 30 has elasticity, it can be elastically deformed under force, so that the magnet assembly 3 can vibrate.

The coil 40 has lead wires, and is connected to the circuit board 5 by the lead wires to realize the electrical connection between the circuit board 5 and the coil 40. After the coil 40 is energized, an electromagnetic field is generated. The direction and strength of the electromagnetic field can be changed by controlling the magnitude, direction and other related parameters of the current in the coil 40, thereby generating an electromagnetic field with periodic or non-periodic changes in polarity. The electromagnetic field applies periodic or non-periodic attractive or repulsive force on the second magnetic part 32, thereby driving the second magnetic part 32 to drive the flexure spring 30 to vibrate back and forth periodically or non-periodically. By controlling the vibration amplitude, frequency and other parameters of the magnet assembly 3 though coil 30, the person wearing the bone conduction sound generating device can hear the corresponding sound.

The first magnetic part 42 and the second magnetic part 32 are magnets, such as Neodymium iron boron magnet, which can attract ferromagnetic substances. The first magnetically conductive part 41 and the second magnetically conductive part 31 are not magnetic, but can be attracted by a magnet. The first magnetically conductive part 41 and the second magnetically conductive part 31 may be ferromagnetic metals such as iron, nickel, and cobalt. The first magnetic part 42 and the second magnetic part 32 are arranged opposite to each other in the same pole, that is, the polarities of the two magnetic poles of the first magnetic part 42 and the second magnetic part 32 that are close to each other are the same, which makes the first magnetic part 42 and the second magnetic part 32 have mutually repulsive forces. Since the first magnetically conductive part 41 and the second magnetically conductive part 31 can be attracted by magnets, a first attractive force will be generated between the first magnetic part 42 and the second magnetically conductive part 31, and a second attractive force will be generated between the second magnetic part 32 and the first magnetically conductive part 41. Preferably, the resultant force of the first attractive force and the second attractive force is equal to the repulsive force, which makes the flexure spring 30 in a balanced state of force, without internal stress and vibrate better in response to the change of magnetic force caused by the change of the magnetic field, to achieve a better fidelity effect. The magnetic energy levels of the first magnetic part 42 and the second magnetic part 32 can be the same, for example, the magnetic energy levels of both are N48; or they may be different, for example, the magnetic energy level of the first magnetic part 42 is N48, and the magnetic energy of the second magnetic part 32 is N35, and vice versa. In specific applications, the magnetic energy levels of the first magnetic part 42 and the second magnetic part 32 can be dynamically adjusted according to the required attractive force and repulsive force.

As shown in FIG. 5, the coil 40 is ring-shaped and has a central hole 400. The first magnetic part 42 is disposed in the central hole 400 of the coil 40. As a preferred embodiment, the shape of the outer peripheral surface of the first magnetic part 42 is consistent with the shape of the central hole 400. It can be understood that under the condition that the size of the central hole 400 is constant, the size of the gap between the outer peripheral surface of the first magnetic part 42 and the inner wall of the central hole 400 determines the volume of the first magnetic part 42 and thus determines the magnitude of the magnetic force between the first magnetic part 42 and the second magnetic part 32. Generally, the smaller the gap, the larger the volume of the first magnetic part 42 and the greater the magnetic force, and vice versa. The smaller the gap, the greater the difficulty of assembly. As a preferred embodiment, the gap between the outer peripheral surface of the first magnetic part 42 and the inner wall of the central hole 400 is above 0.05 mm, so that the first magnetic part 42 is easier to install. Further, the height of the first magnetic part 42 is set not higher than the height of the coil 40, so that the coil 40 and the second magnetic part 32 is closer, which enables the magnet assembly 3 to vibrate more sensitively in response to changes in the magnetic field of the coil 40.

The shape of the first magnetically conductive part 41 and the second magnetically conductive part 31 is not limited. In a preferred embodiment, the first magnetically conductive part 41 and the second magnetically conductive part 31 are both plate-shaped. FIG. 5 shows the state when the first magnetic conductive part 41 is plate-shaped. In another preferred embodiment, both the first magnetically conductive part 41 and the second magnetically conductive part 31 include a plate portion 310 having a plate shape, and a ring portion 311 protruding from the plate portion 310. A receiving cavity 313 is formed between the ring portion 311 and the plate portion 310. The second magnetic part 32 of the magnet assembly 3 is accommodated in the receiving cavity 313 of the second magnetically conductive part 31. The coil 40 of the voice coil assembly 4 and the first magnetic part 42 is accommodated in the receiving cavity 313 of the first magnetically conductive part 41. Referring to FIG. 6, FIG. 6 shows a state when the second magnetic conductive part 31 includes the plate portion 310 and the ring portion 311. In other embodiments, one of the first magnetically conductive part 41 and the second magnetically conductive part 31 has a plate shape, and the other includes a plate portion 310 and a ring portion 311 protruding from the plate portion 310. In this embodiment, the first magnetically conductive part 41 is plate-shaped, and the second magnetic conductive part 31 includes a plate portion 310 and a ring portion 311 protruding from the plate portion 310.

Figure 7:
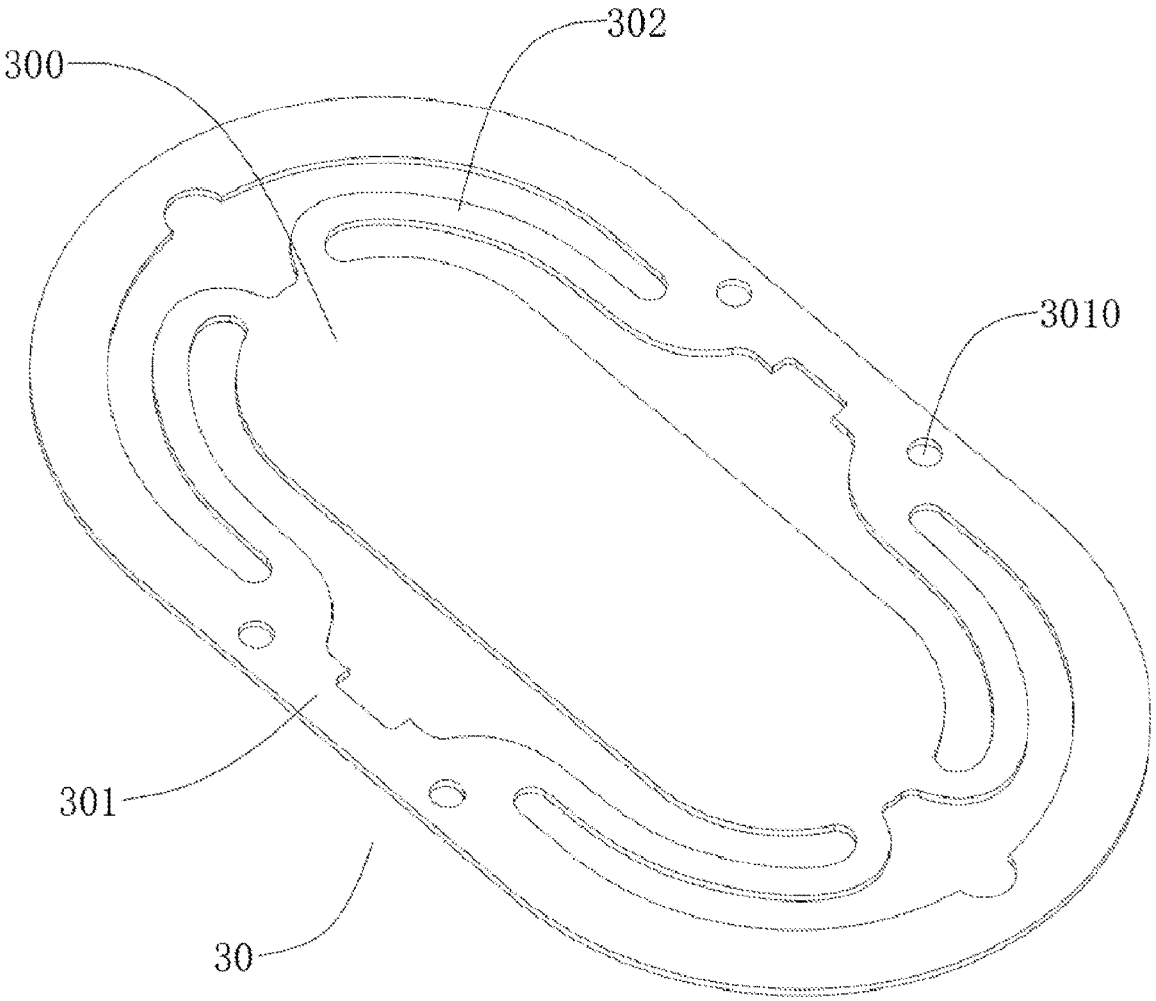
FIG. 7 is a schematic structural diagram of a flexure spring according to an embodiment of the present application.

As a preferred embodiment, as shown in FIG. 7, the flexure spring 30 is in the shape of a sheet as a whole, and includes a body 300, an outer ring body 301 arranged around the outside of the body 300, and a number of connecting arms 302 connected between the body 300 and the outer ring body 301 (in this embodiment, the number of connecting arms 302 is 4), wherein the outer ring body 301 is used to connect with the cover 2 and the case 1, and the main body 300 is connected with the second magnetically conductive part 31. When the magnet assembly 3 vibrates, the outer ring body 301 is fixed, and the displacement of the main body 300 and the second magnetically conductive part 31 and the second magnetic part 32 during vibration is realized by the elastic deformation of the connecting arm 302.

Figure 4:
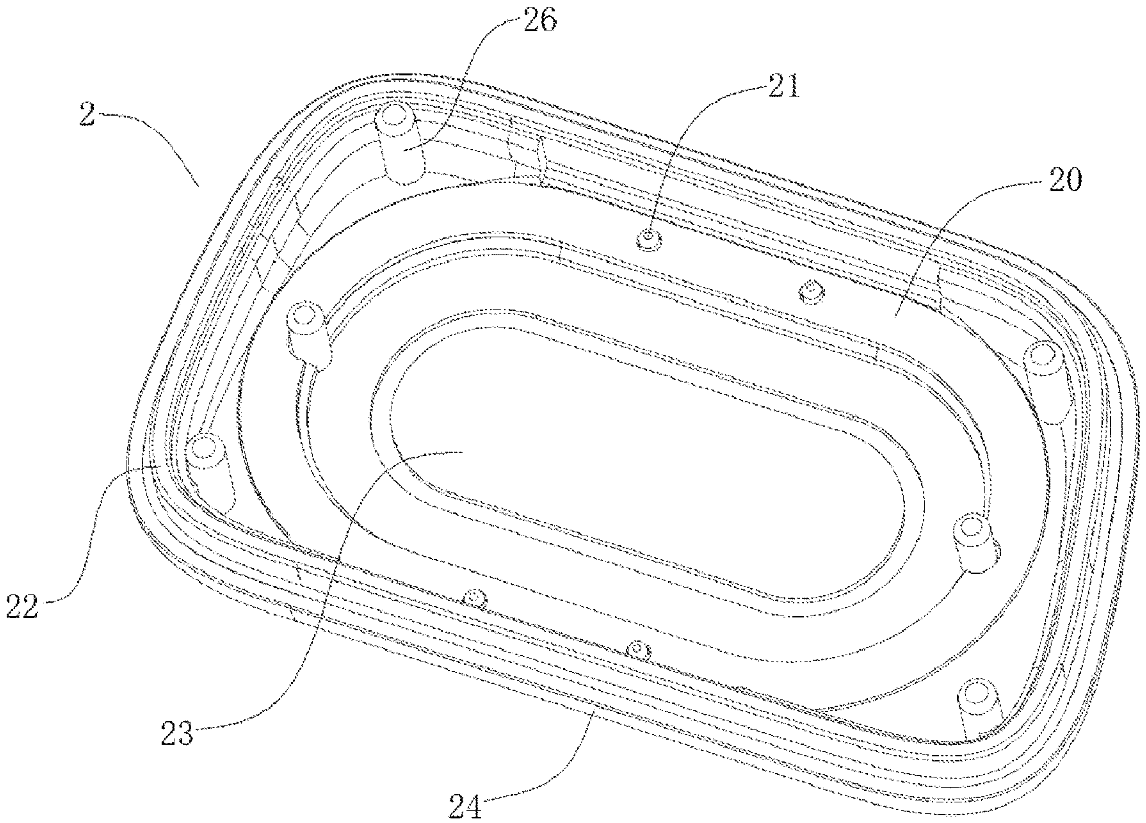
FIG. 4 is a schematic structural diagram of a cover according to an embodiment of the present application.
Figure 8:
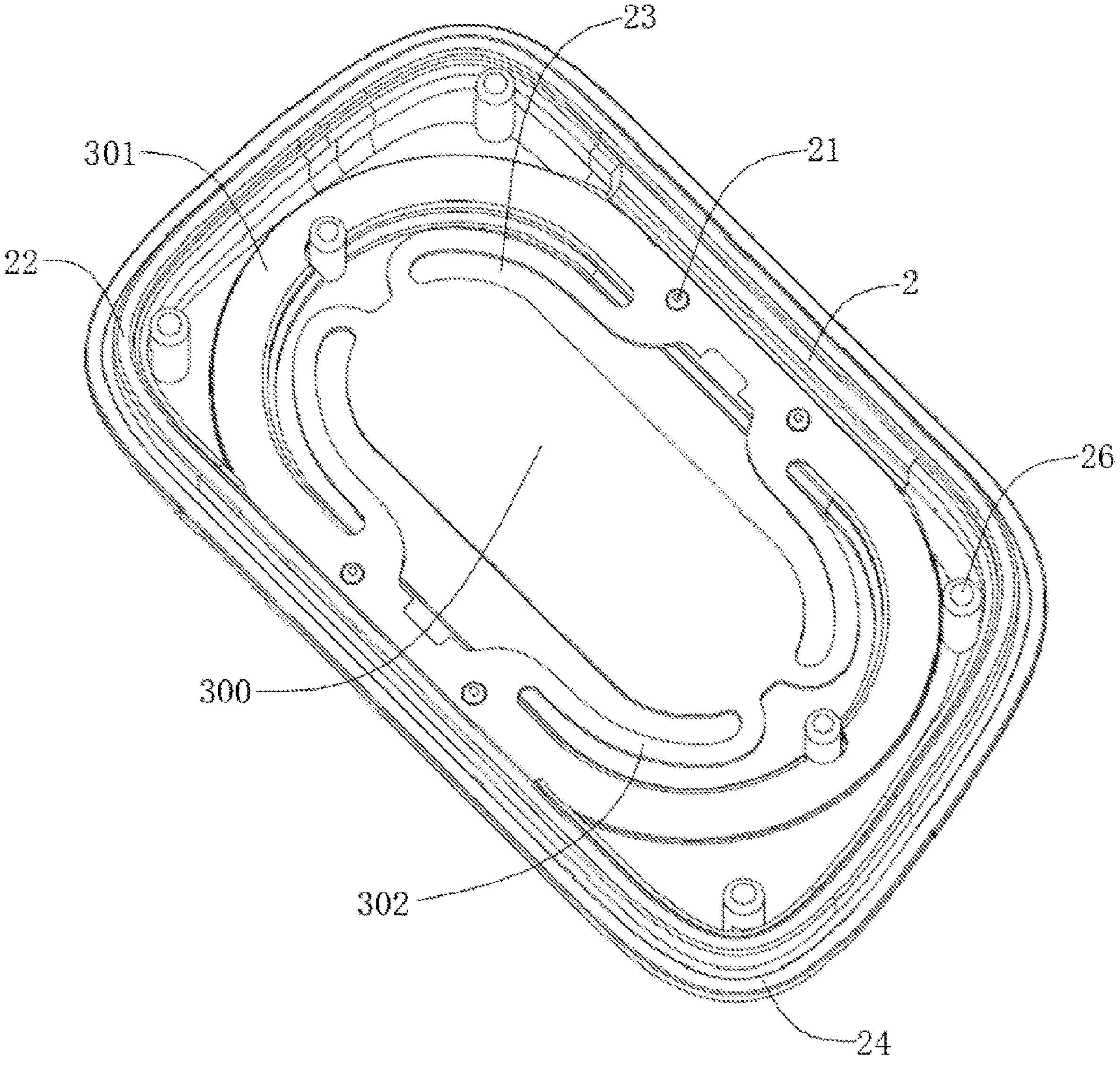
FIG. 8 is a schematic diagram of the connection between the flexure spring and the cover according to an embodiment of the present application.

As shown in FIGS. 4, 7 and 8, the cover 2 has a connecting surface 20 for adhering to the outer ring body 301, and the first surface of the outer ring body 301 and the connecting surface 20 are preferably connected by glue. A convex positioning shaft 21 is provided on the connecting surface 20, and the outer ring body 301 is provided with a first positioning through hole 3010 adapted to the positioning shaft 21. The positioning of the flexure spring 30 is realized by the mating of the positioning shaft 21 and the first positioning through hole 3010, so that the position accuracy of the flexure spring 30 is better, and it will not shift or deviate during the movement. The number of positioning shafts 21 is not limited. In this embodiment, the number of positioning shafts 21 is four, and correspondingly, the number of positioning through holes 3010 is also four.

It is understandable that, in order to enable the flexure spring 30 to deform toward the side where the cover 2 is located, an avoidance hole 23 is provided on the surface of the cover 2 opposite to the flexure spring 30, so as to provide the space required by the body 300 and the connecting arm 302 during vibration.

In order to make the fixation of the flexure spring 30 more reliable, in addition to the first surface of the outer ring body 301 of the flexure spring 30 being connected to the cover 2, the second surface of the outer ring body 301 opposite to the first surface is supported by the case 1 and connected to the case 1. In this way, the two sides of the flexure spring 30 are respectively fixed by the cover 2 and the case 1, and the fixing of its position is more reliable.

Figure 3:
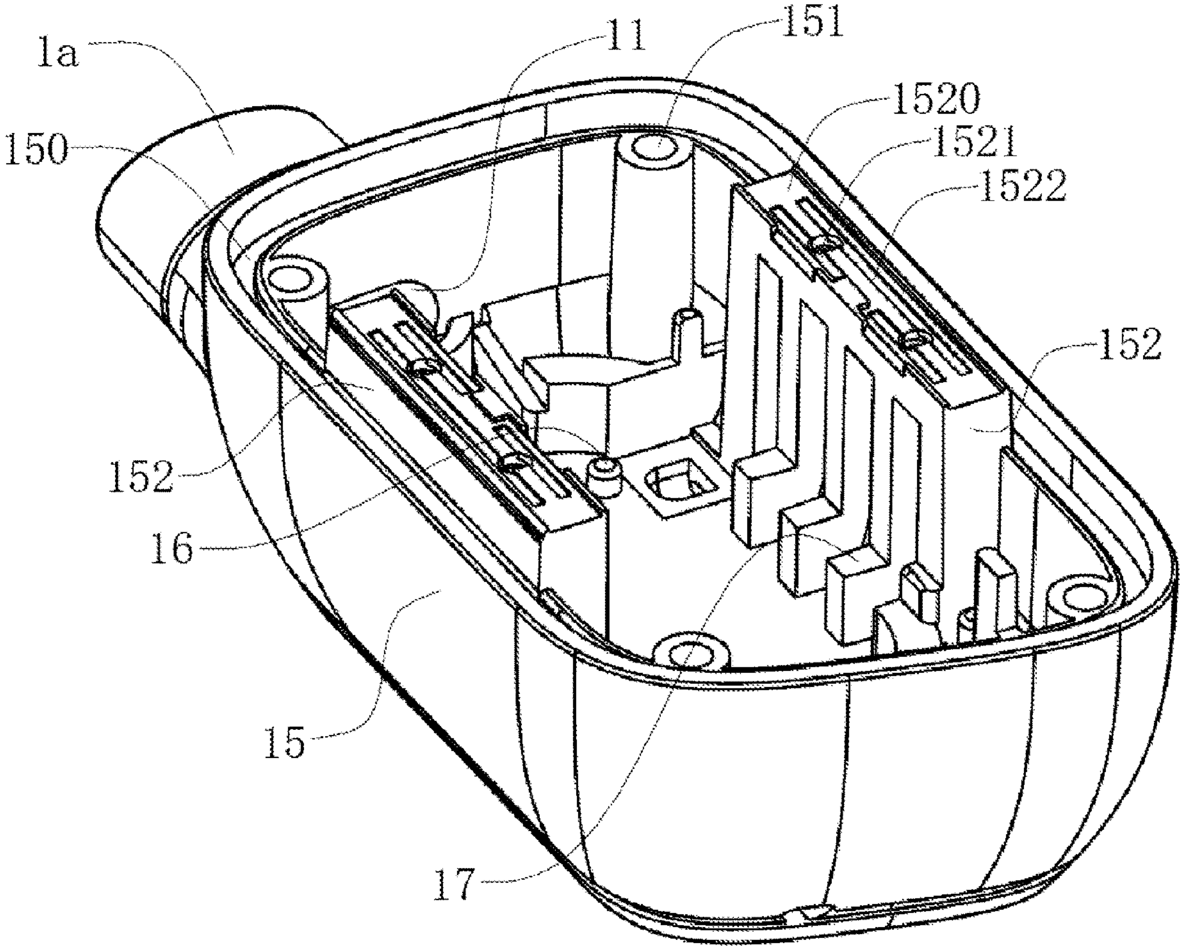
FIG. 3 is a schematic structural diagram of a case according to an embodiment of the present application.
Figure 9:
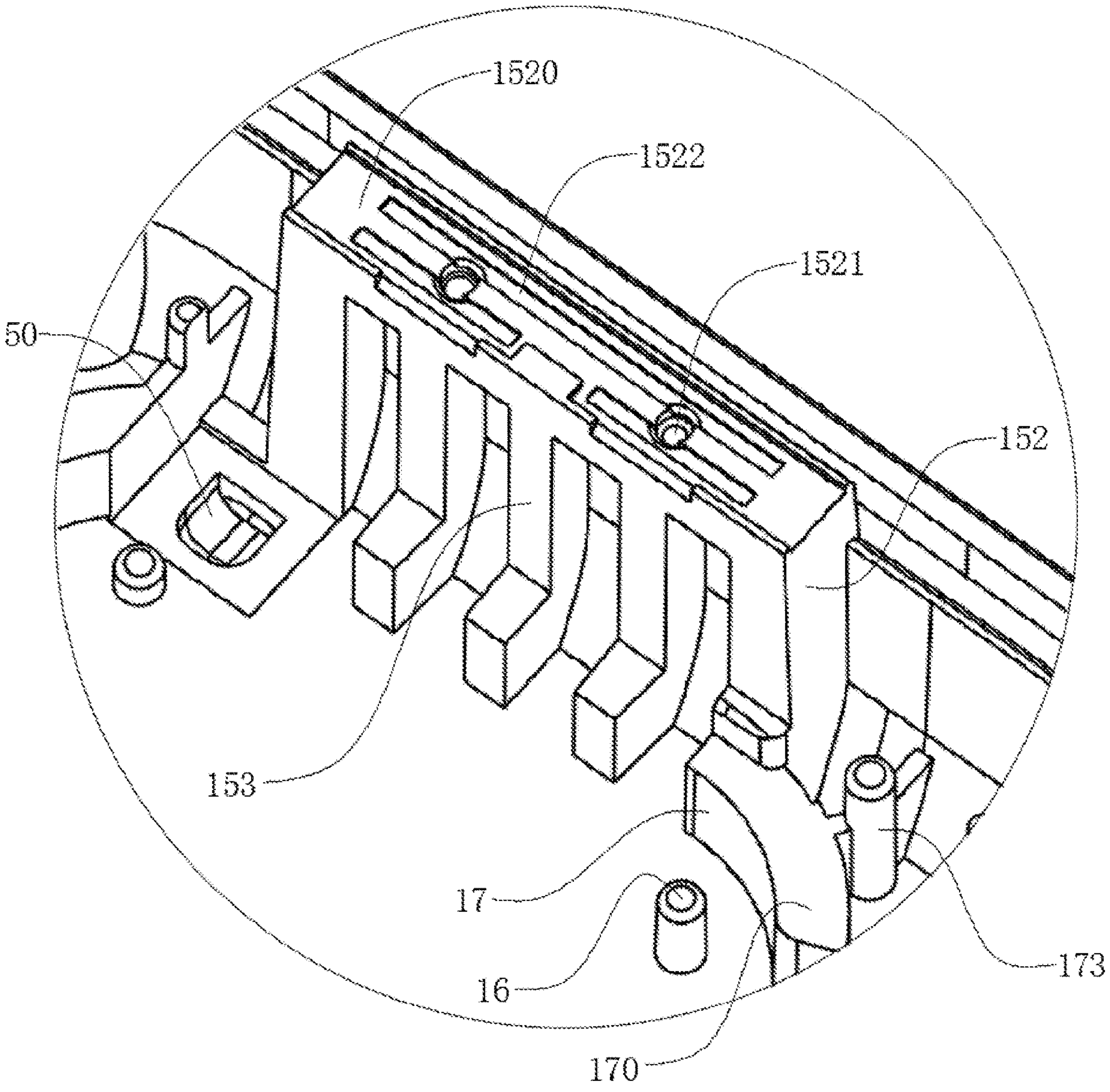
FIG. 9 is a schematic structural diagram of the support seat on the case according to an embodiment of the present application.

Specifically, referring to FIGS. 3 and 9, the case 1 is provided with a support seat 152 for supporting the flexure spring 30. The support seat 152 is located in the cavity 10 and connected to the side case portion 15. The support seat 152 is supported at least on the part where the outer ring body 301 and the connecting arm 302 are connected, and the number is not limited. In this embodiment, the number of the support seat 152 is two, which symmetrically support both sides of the flexure spring 30. In other embodiments the number of support seats 152 may be more, so as to support more parts of the flexure spring 30. The support seat 152 is provided with a position limiting groove 1520. The outer ring body 31 is fitted into the position limiting groove 1520, and a second positioning through hole 1521 corresponding to the position of the above-mentioned first positioning through hole 3010 is provided on the bottom surface of the position limiting groove 1520. After the installation is completed, the positioning shaft 21 of the cover 2 passes through the first positioning through hole 3010 and is simultaneously fitted into the second positioning through hole 1521, thereby further improving the firmness of the flexure spring 30 installation.

In order to enhance the firmness of the connection, the flexure spring 30 is adhered to the cover 2 by double-sided adhesive, and pasted on the support seat 152 by glue. Furthermore, a recessed glue overflow groove 1522. is provided on the bottom surface of the position limiting groove 1520. The glue overflow groove 1522 is connected with the second positioning through hole 1521 to accommodate more glue and enhance the firmness of the adhesion.

As a preferred embodiment, the upper end of the support base 152 extends beyond the upper end of the side case portion 15, so that when the cover 2 is installed, the alignment installation of the flexure spring 30 and the support seat 152 is more convenient, and the space for installing the magnet assembly 3 can also be increased.

As shown in FIG. 9, the case 1 further includes a reinforcing rib 153 connected to the support seat 152. The reinforcing rib 153 is supported on the bottom of the support seat 152 and connected to the side case portion 15 and the base case portion 14 to strengthen the stiffness of the support seat 152, and provide reliable support for the flexure spring 30. The number of the reinforcing ribs 153 may be one or more. In the case that the number of the reinforcing ribs 153 is multiple, the reinforcing ribs 153 are arranged at intervals, and there is a space between two adjacent reinforcing ribs 153. The structure of a plurality of reinforcing ribs 153 arranged at intervals can prevent the appearance of the case 1 from shrinking due to the partial thickness of the plastic, which is convenient for controlling the molding quality.

In order to allow the connecting arm 302 to be fully elastically deformed, and thereby the body 300 to have a greater amplitude, the connecting arm 302 is suspended so as not to contact the second magnetically conductive part 31. Therefore, it is avoided that the second magnetically conductive part 31 hinders the deformation of the connecting arm 302. In a preferred embodiment, as shown in FIG. 6, a low-frequency adjusting plate 312 is provided between the second magnetically conductive part 31 and the body 300, and the low-frequency adjusting plate 312 is in contact with the body 300 but not with the connecting arm 302. Therefore, the second magnetically conductive part 31 and the connecting arm 302 are separated to prevent the two from contacting. The low frequency adjusting plate 312 may be an independent component, or it may be integrally formed with the second magnetically conductive part 31 or the main body 300, where the low-frequency adjusting plate 312 is the protruding part of the second magnetically conductive part 31 or the body 300. The arrangement of the low-frequency adjusting plate 312 can make the vibration amplitude of the magnet assembly 3 larger, thereby making the low-frequency sound effect and sound quality of the bone conduction acoustic device better.

In the same way, the cover 2 is also set so as not to contact the connecting arm 302. At this time, the connecting surface 20 is set not to exceed the inner peripheral surface of the outer ring body 301. Preferably, the contour of the connecting surface 20 is the same as that of the outer ring body 301

Figure 10:
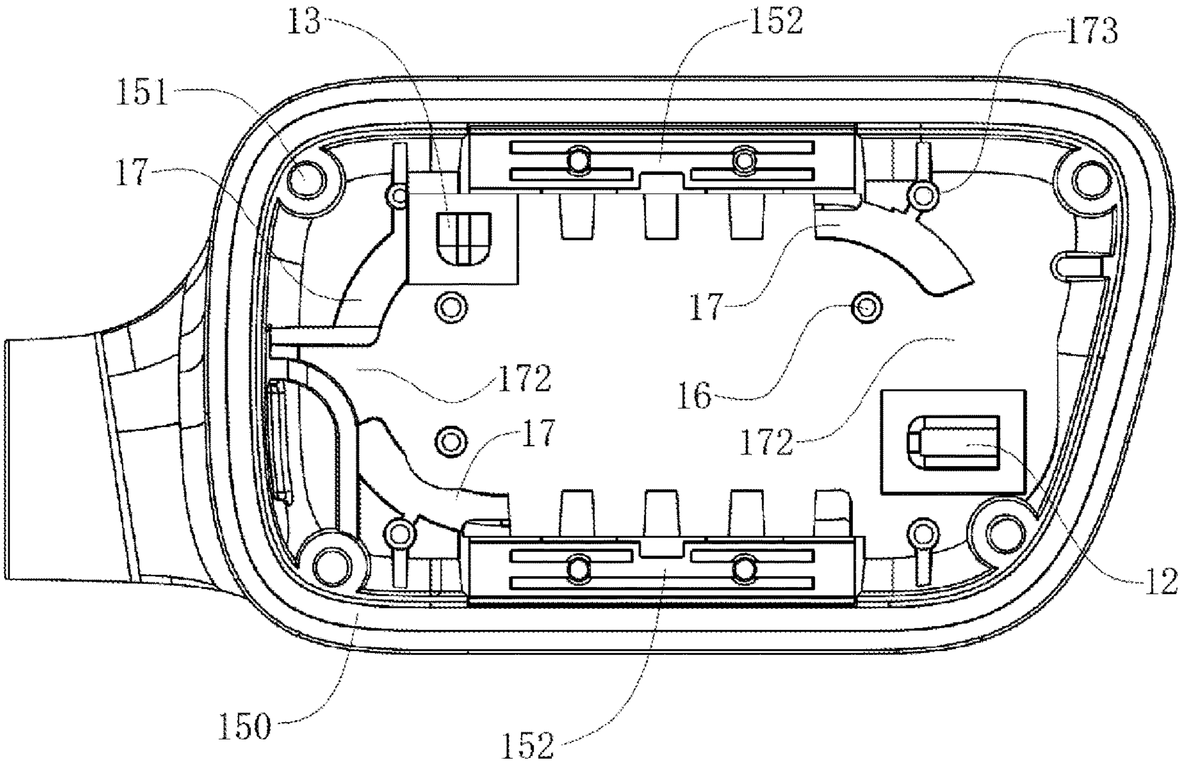
FIG. 10 is a plan view of a case according to an embodiment of the present application.
Figure 11:
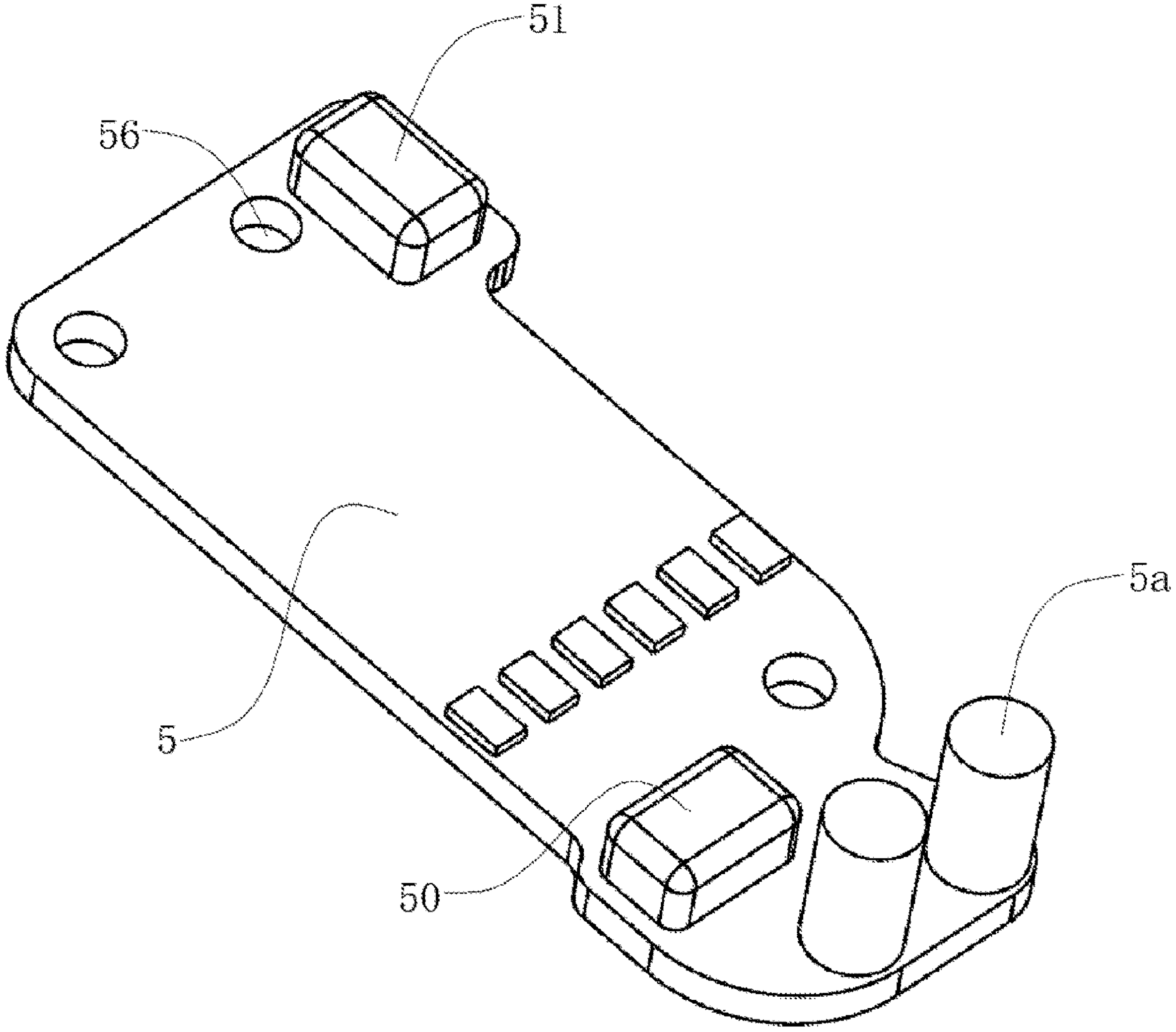
FIG. 11 is a schematic structural diagram of a circuit board according to an embodiment of the present application.
Figure 12:
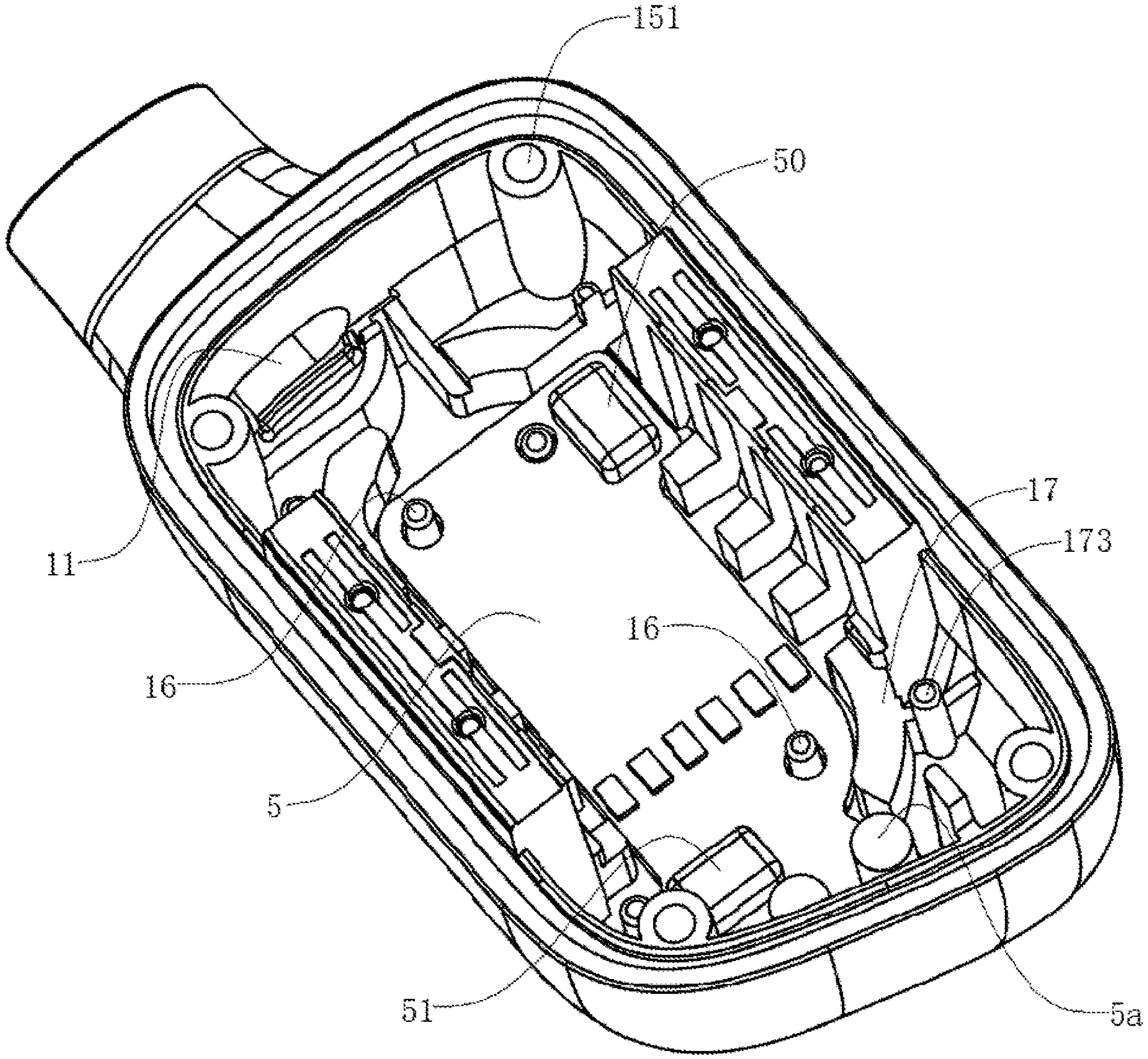
FIG. 12 is a schematic structural diagram of a circuit board installed in a case according to an embodiment of the present application.

In order to facilitate the installation of the circuit board 5, as shown in FIGS. 10 to 12, at least one third positioning post 16 protruding into the cavity 10 is provided on the base case portion 14. The circuit board 5 is provided with a circuit board positioning hole 56 adapted to the third positioning post 16 to position the circuit board 5 through the mating of the third positioning post 16 and the circuit board positioning hole 56. The connection manner of the circuit board 5 and the base case portion 14 is not limited. For example, when installing the circuit board 5, the glue may be applied on the surface of the circuit board 5 or the double-sided adhesive may be attached to the circuit board 5, and then the circuit board 5 is installed on the base case portion 14 through the third positioning post 16 to ensure the accuracy of the position of the circuit board 5. For another example, one or more of the third positioning posts 16 may be set as hot-melt posts, and the hot-melt posts are heated to melt and deform so that the circuit board 5 is fixed on the base case portion 14. For another example, the circuit board 5 can be fixed to the base case portion 14 by fasteners such as screws.

Figure 13:
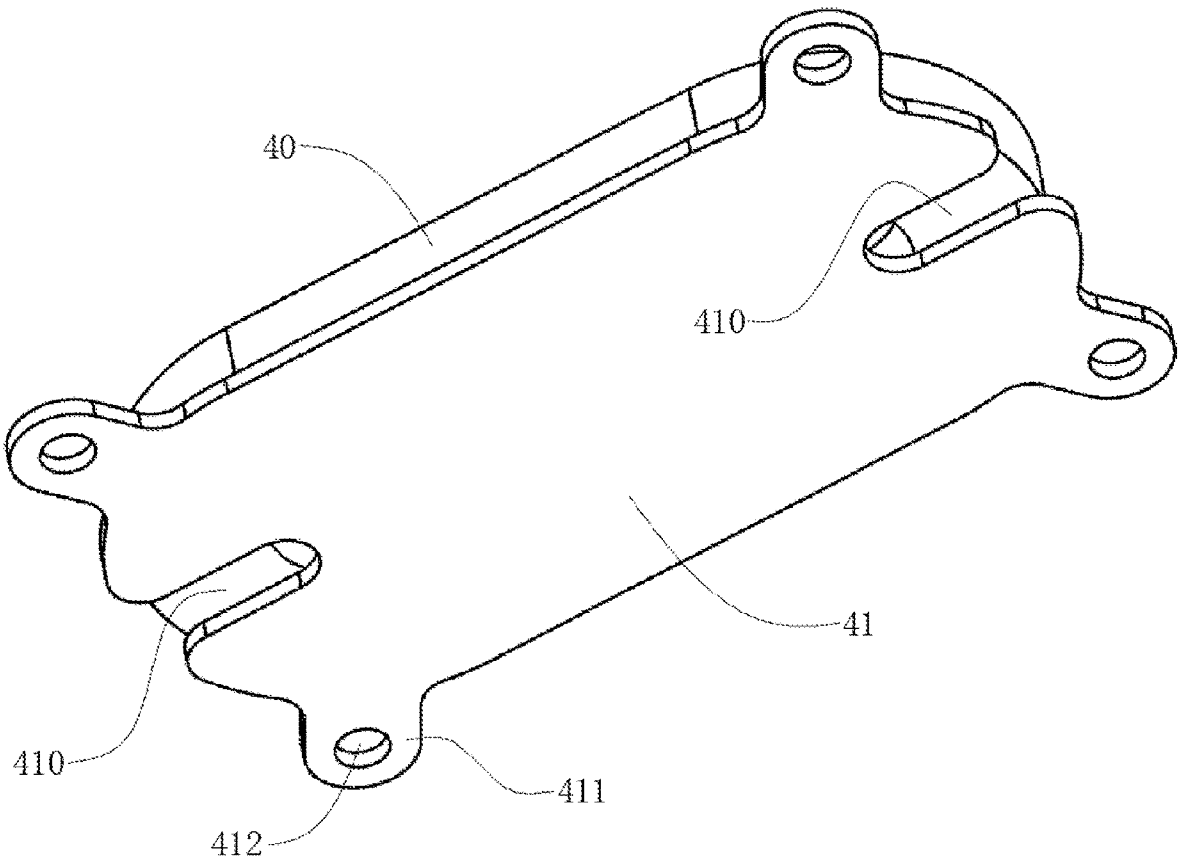
FIG. 13 is a schematic structural diagram of the voice coil assembly in FIG. 5 in another view direction.
Figure 14:
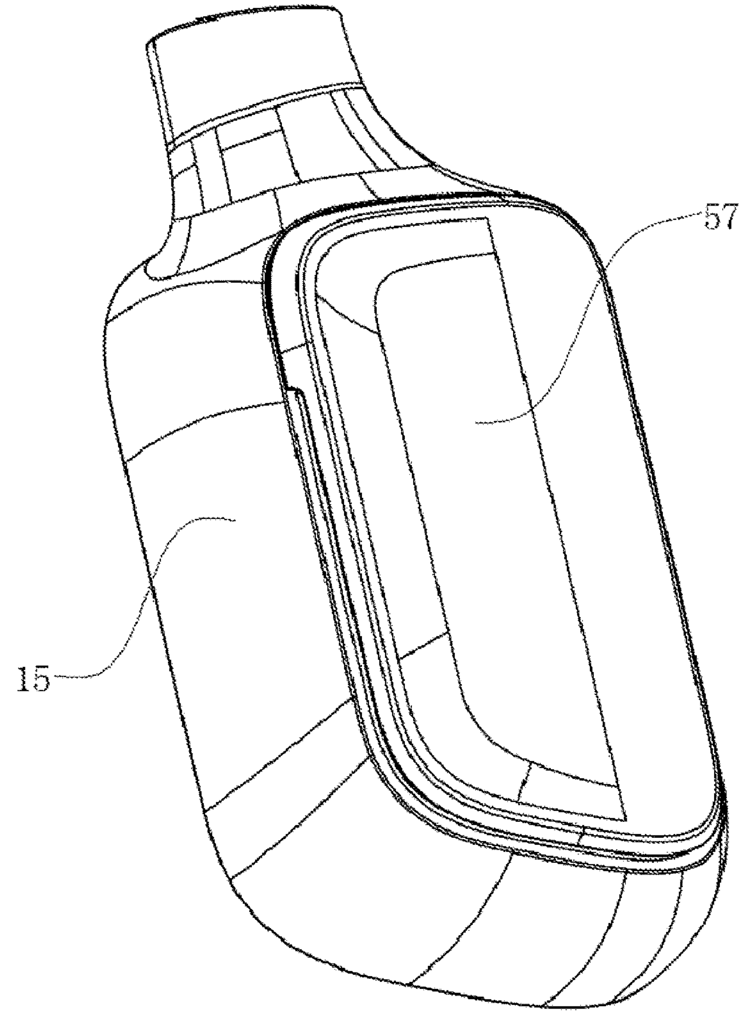
FIG. 14 is a schematic structural diagram of a case according to another embodiment of the present application.
Figure 15:
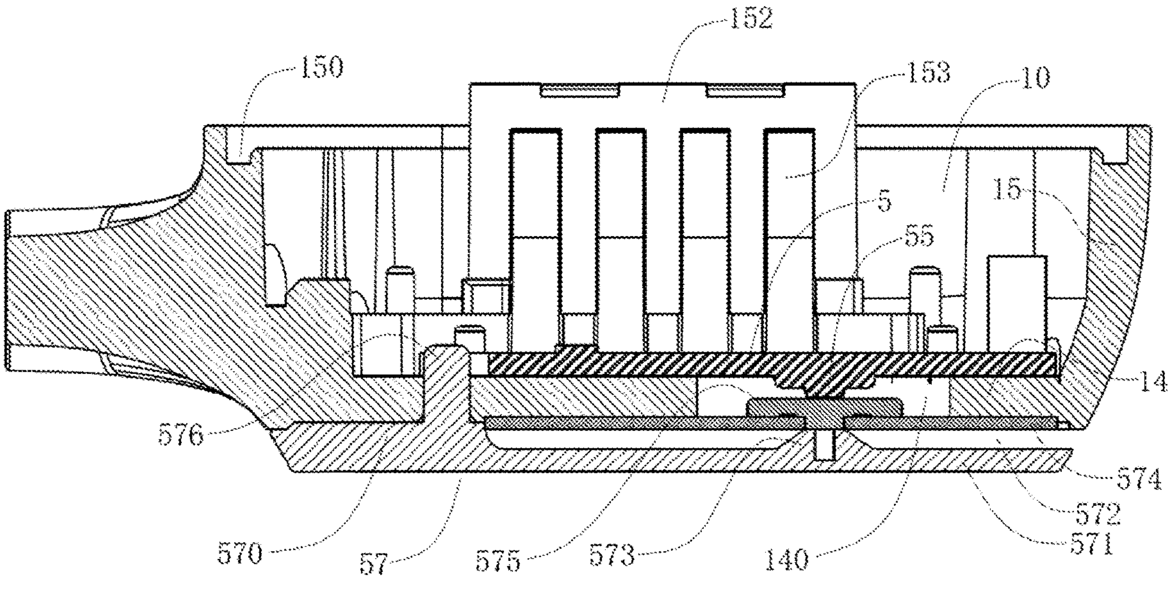
FIG. 15 is a schematic cross-sectional view of the button assembly connected to the case according to an embodiment of the present application.

Further, as shown in FIGS. 9 and 10, in order to facilitate the installation of the first magnetically conductive part 41, the base case portion 14 is further provided with a supporting boss 17 protruding into the cavity 10. The supporting boss 17 includes a supporting surface 170 that supports the first magnetically conductive part 41. The supporting boss 17 forms an installation space for accommodating the circuit board 5 between the first magnetically conductive part 41 and the base case portion 14, therefore, the first magnetically conductive part 41 does not compress the circuit board 5, and the circuit board 5 is more reliable in use. At the same time, the internal structural design of the bone conduction acoustic device is more reasonable and compact. The supporting boss 17 is also provided with a number of fourth positioning posts 173. As shown in FIG. 13, the first magnetically conductive part 41 is provided with a convex connecting portion 411 which has a mounting hole 412 adapted to the fourth positioning post 173. Through the mating of the fourth positioning post 173 with the mounting hole 412, the first magnetically conductive part 41 can be positioned on the supporting boss 17. Preferably, one or more of the fourth positioning posts 173 are hot-melt posts, and the first magnetically conductive part 41 can be fixed on the supporting boss 17 by heat-melting.

It should be pointed out that the supporting boss 17 can be in a closed ring shape or in an intermittent ring shape. As shown in FIG. 10, in this embodiment, the supporting boss 17 is in an intermittent ring shape with a number of notches 172, so as to eliminate the internal stress of the support boss 17 during molding, to make it more accurate. At the same time, it can also facilitate the arrangement of the circuit board 5. For example, the circuit board 5 can be made as close to the wiring hole 11 as possible.

The circuit board 5 is electrically connected to the lead wire of the coil 40 and the external circuit. In order to facilitate the lead wire of the coil 40 to be drawn out, as shown in FIG. 13, an avoidance groove 410 for the lead wire to pass through is provided on the first magnetic conductive part 41 (In other embodiments, it may also be an avoidance hole). In this way, the lead wires are arranged in the avoidance groove 410, and there is no need to bend or the amount of bending is less, and the wiring is more convenient. As a preferred embodiment, the two ends of the first magnetically conductive part 41 are symmetrically provided with avoidance grooves 410, so that even if the first magnetically conductive part 41 is installed in a different position, it can be easily routed, has stronger fault tolerance, and is easier to install. As shown in FIGS. 11 and 12, the circuit board 5 is provided with a terminal **5*a* protruding toward the side where the coil 40 is located. The terminal 5***a* is a copper column. One end of the terminal 54 is connected and conducted with the lead wire of the coil 40, and the other end is connected and conducted with the circuit of the circuit board 5. The terminal 54 may be mounted on the electric circuit board 5 by SMT (Surface Mounted Technology), welded on the circuit board 5, or riveted on the circuit board 5. Of course, the above three connection methods are not limited to alternative use, and two or three of them can be implemented at the same time.

Since the terminal 5*a* is closer to the coil 40, the connection between the coil 40 and the terminal 5*a* is more convenient. Preferably, the terminal 5*a* extends to the outside of the outer peripheral surface of the first magnetically conductive part 41 to further facilitate the welding operation of the lead wire of the coil 40 with it.

The terminal 5*a* is arranged on the end of the circuit board 5 away from the wiring hole 11. On the one hand, it may prevent the terminal 5*a* from blocking the wiring hole 11, which makes it easier for the cables of the external circuit to pass through the wiring hole 11. On the other hand, the welding area of the cable between the circuit board 5 and the external circuit may be increased, so that the welding operation is more convenient and the welding quality is better.

Figure 16:
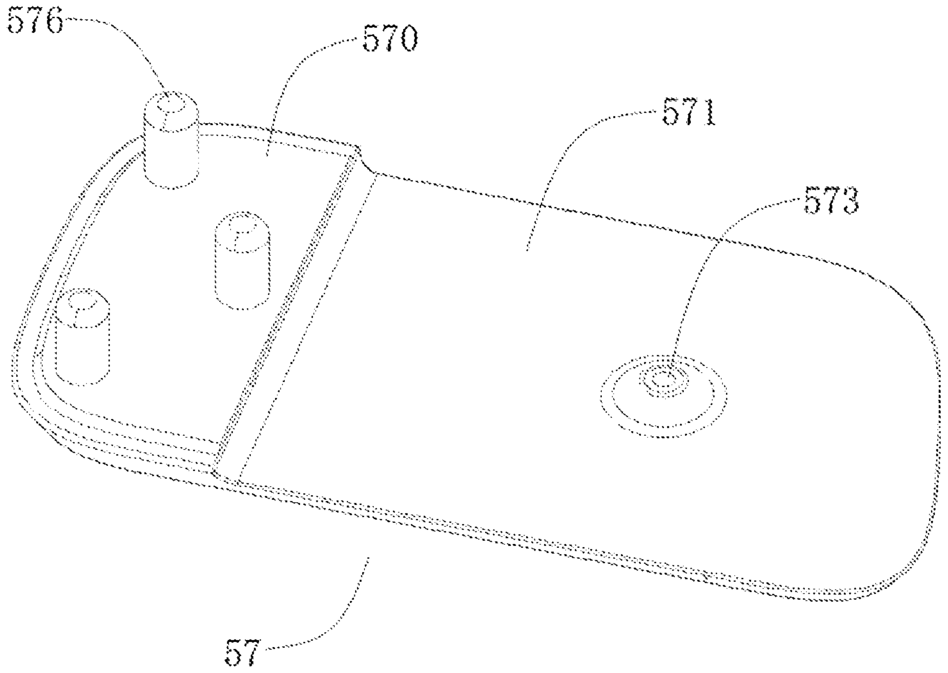
FIG. 16 is a schematic structural diagram of a pressing panel according to an embodiment of the present application.
Figure 17:
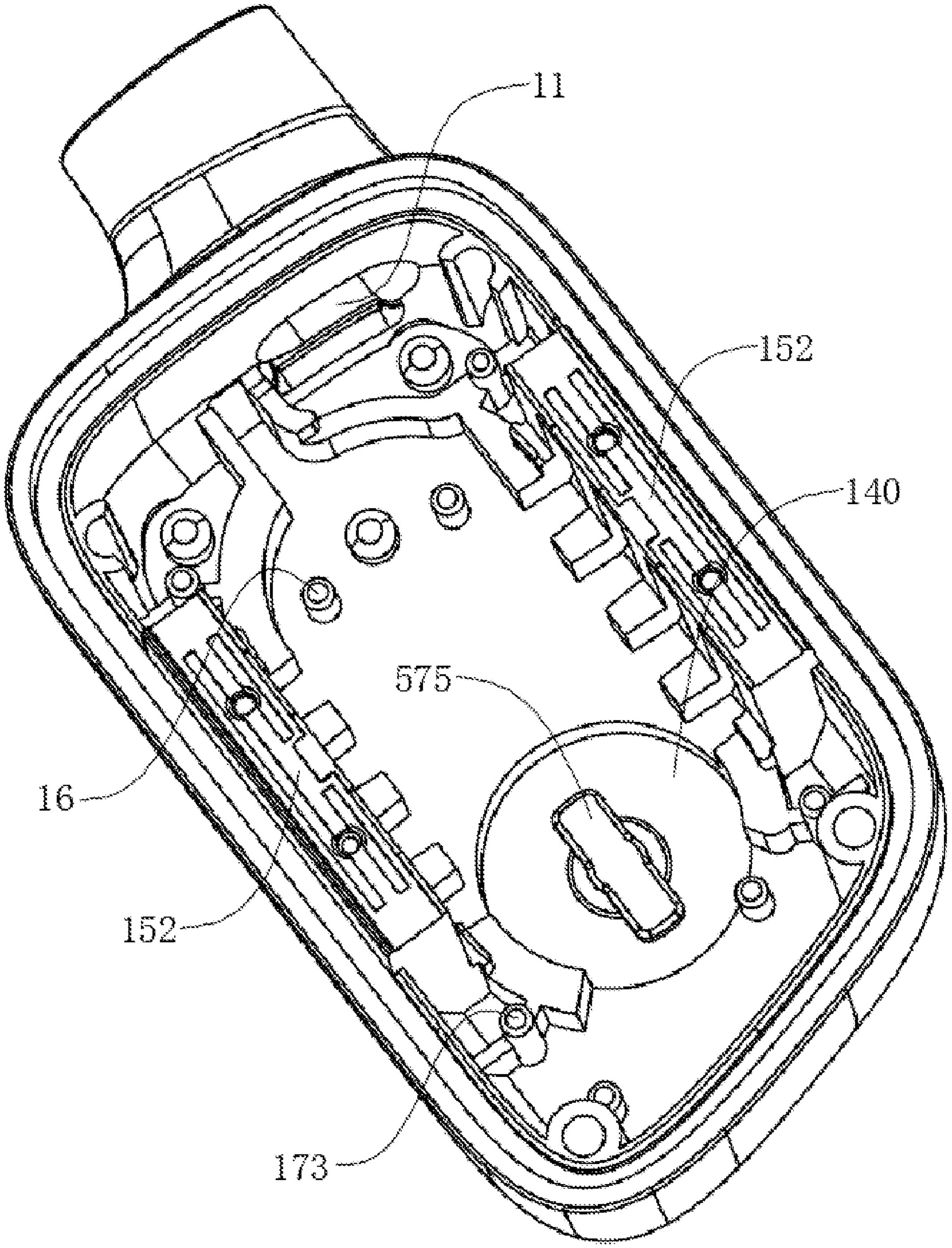
FIG. 17 is a schematic diagram of a case connected with a flexible pad and a pressing part according to an embodiment of the present application.

As a preferred embodiment, as shown in FIGS. 14 to 17, the second bone conduction acoustic device 61 also includes a button assembly connected to the circuit board 5, so that the user can perform certain control functions by manipulating the button assembly, such as turning on/off and switching audio, etc. Preferably, the button assembly includes a switch 55 provided on the circuit board 5 and a pressing panel 57 connected to the outer surface of the base case portion 14. The pressing panel 57 may be driven by pressing the pressing panel 57 to trigger the switch 55 to operate, thereby turning on or off the circuit, and sending out the corresponding signal. The switch 55 is preferably a tact switch, a micro switch, etc. In this embodiment, the switch 55 is a tact switch. As shown in FIGS. 16 and 17, the pressing panel 57 includes a base 570 and a pressing part 571 connected to the base 570. The thickness of the pressing part 571 is smaller than the thickness of the base 570. After the base 570 is connected to the base case portion 14, one end of the pressing part 571 is fixedly connected to the base 570, and the other end is suspended. There is a space 572 between the pressing part 571 and the base case portion 570, so that when the pressing part 571 is pressed, the pressing part 571 can be easily deformed, so that the pressing part 571 can trigger the switch 55 to implement corresponding functions. The base 570 and the base case portion 14 may be connected by glue or by a hot-melt column 576, for example. Obviously, the thinner the pressing part 571 is, the easier it is to deform, and the smaller the pressure required to drive it to deform. But too thin thickness will also make the pressing part 571 easy to break. Preferably, the thickness of the pressing part 571 is greater than 0.3 mm, and more preferably, the thickness of the pressing part 571 is greater than 0.4 mm, and still more preferably, the thickness of the pressing part 571 is greater than 0.6 mm, so that the pressing part 571 is easy to deform, but not easy to break, and has better reliability.

The base case portion 14 is provided with an avoidance through hole 140 corresponding to the switch 55 so that the pressing panel 57 can contact the switch 55, and the pressing part 571 is provided with a bump 573 corresponding to the switch 55. In a preferred embodiment, when the button assembly is pressed, the bump 573 directly contacts and presses the switch 55. In another preferred embodiment, the button assembly further includes a flexible pad 574 connected to the outer surface of the base case 14 and a pressing part 575 connected to the flexible pad 574, and the pressing part 575 is located between the flexible pad 574 and the switch 55, the position of the bump 573 corresponds to the position of the pressing part 575. When the pressing part 571 is pressed, the bump 573 drives the flexible pad 574 to deform, so that the pressing part 575 presses the switch 55. Since the flexible pad 574 seals the avoidance through hole 140, external foreign matter will not enter the cavity 10. This makes it more waterproof and dust-proof, which is beneficial to the long-term and reliable operation of bone conduction acoustic device. Preferably, the material of the flexible pad 574 is silicone, which can be connected to the base case portion 14 by pasting or the like. The material of the pressing part 575 is plastic, which can be connected to the flexible pad 574 by attaching or the like.

Since the pressing panel 57 is arranged outside the base case portion 14, its area can be easily enlarged, so that the human hand can easily touch and operate the pressing panel 57, which improves the convenience of use. As a preferred embodiment, the outer contour shape of the pressing panel 57 and the base case portion 14 are consistent to improve the overall aesthetics. More preferably, the pressing part 571 occupies more than 50% of the surface area of the pressing panel 57; more preferably, the pressing part 571 occupies more than 70% of the surface area of the pressing panel 57; more preferably, the pressing part 571 occupies more than 90% of the surface area of the pressing panel 57.

In order to make the operation of the key structure more labor-saving, the base 570 is provided on one side of the pressing part 571, so that the hanging length of the pressing part 571 can be made longer, and it can be deformed with less force, thereby making pressing of pressing part 571 more labor-saving.

As a preferred embodiment, as shown in FIG. 11, the circuit PCB board 5 is provided with a first microphone 50 and a second microphone 51, wherein the first microphone 50 is mainly used to receive the voice of the user (Voice), and the second microphone 51 is mainly used to receive ambient sound (background noise) for active noise cancelation. Compared with the second microphone 51, the first microphone 50 is arranged on the case 1 closer to the user's mouth, so as to receive a louder and clearer voice.

Figure 18:
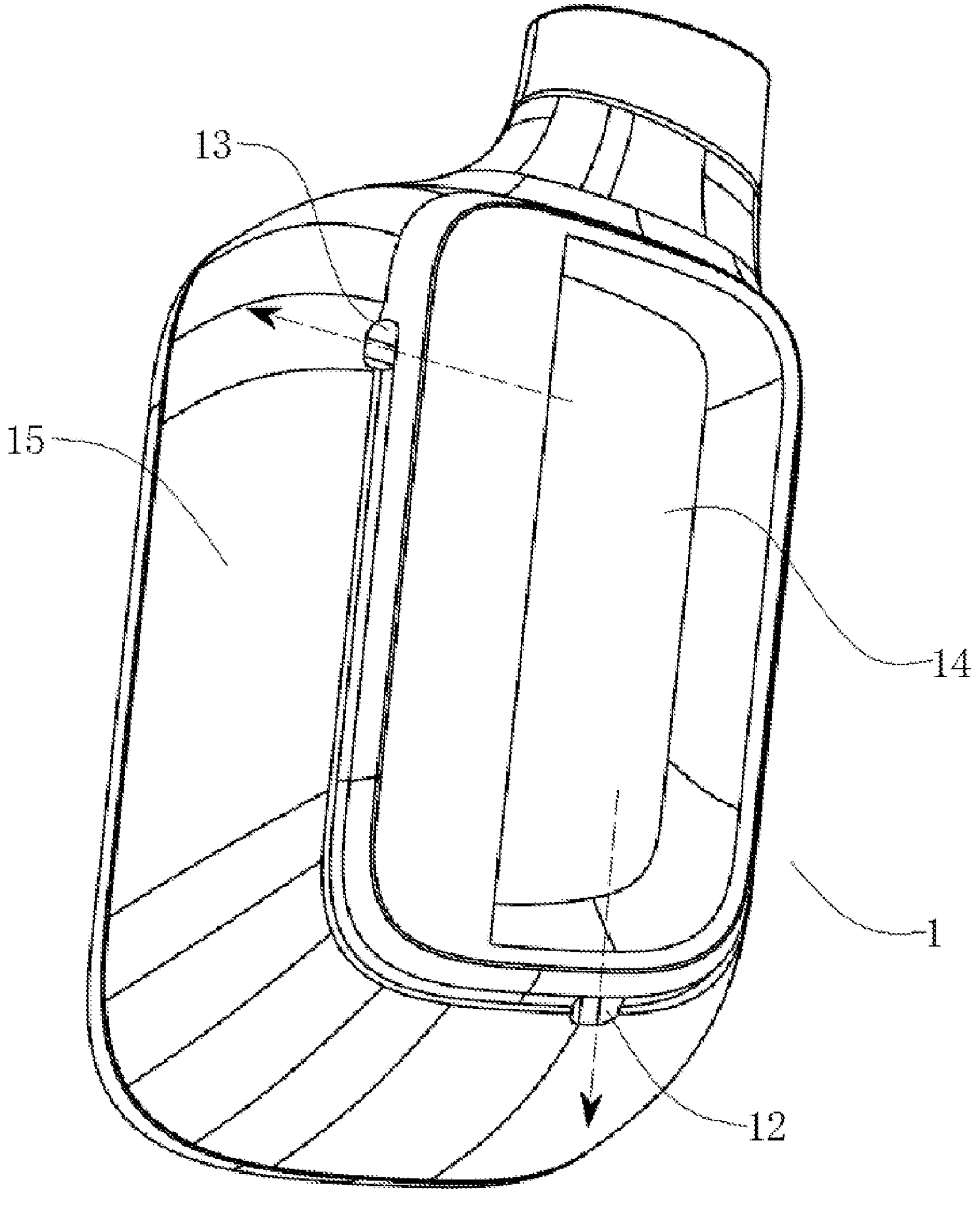
FIG. 18 is a schematic structural diagram of a bone conduction acoustic device provided with a first microphone hole and a second microphone hole according to an embodiment of the present application.

Further, as shown in FIGS. 18, the case 1 is also provided with a first microphone hole 12 corresponding to the first microphone 50 and a second microphone hole 13 corresponding to the second microphone 51 to allow the external sound to be better transmitted to and captured by the microphone.

As a preferred embodiment, the distance between the center of the first microphone hole 12 and the center of the second microphone hole 13 is not less than 15 mm (the center of the microphone hole refers to the center of the contour shape on the outer surface of the case 1 where the microphone hole is located) to reduce the correlation between the sounds received by the first microphone 12 and the second microphone 13, so that the microphone array formed by the two microphones has stronger directivity and is more convenient to perform noise cancelation processing, the voice quality heard by the person talking with the user is higher, the background noise and wind noise are lower, and the sound is clearer.

As a preferred embodiment, as shown in FIG. 18, the positive directions of the axes of the first microphone hole 12 and the second microphone hole 13 are not blocked by the auricle. In this application, the positive direction of the microphone hole refers to the direction from the inside of the cavity 10 to the outside, referring to the direction of the arrow in FIG. 18. It should be pointed out that the bone conduction acoustic device shown in FIG. 18 is not provided with a button assembly. Because the shape of the auricle easily causes the sound to converge here, if the positive direction of the microphone hole axis is blocked by the auricle, it is easy to receive the sound converged at the auricle, resulting in unbalanced volume and affecting the sound quality of the bone conduction acoustic device.

As a preferred embodiment, the angle between the positive direction of the axis of the first microphone hole 12 and the second microphone hole 13 is not less than 70°, so that the sound collected by the first microphone 50 and the second microphone 51 has low correlation to improve the noise cancelation effect; more preferably, the angle between the positive direction of the axis of the first microphone hole 12 and the second microphone hole 13 is 90°, at this time the sound collected by the first microphone 50 and the second microphone 51 has the least correlation and the noise cancelation effect is the best.

It is understandable that in the present application, the first microphone 50 and the second microphone 51 form a microphone array, and the microphone array will form a directivity when receiving the sound. Through the above reasonable design, the microphone array is directed to the direction of the person's mouth, so that the sound received during the reception is mainly the sound from the person's mouth, and the environmental noise is filtered out due to the directivity of the microphone array and is not processed. Two microphones have different input signals, and the algorithm is used to denoise the background noise and wind noise. Finally, the person who talks with the user can hear the clear voice after filtering out the environmental noise and wind noise to achieve noise cancelation during the call. This improves the sound quality and call quality of the bone conduction acoustic device and the bone conduction earphone with the bone conduction acoustic device.

Figure 19:
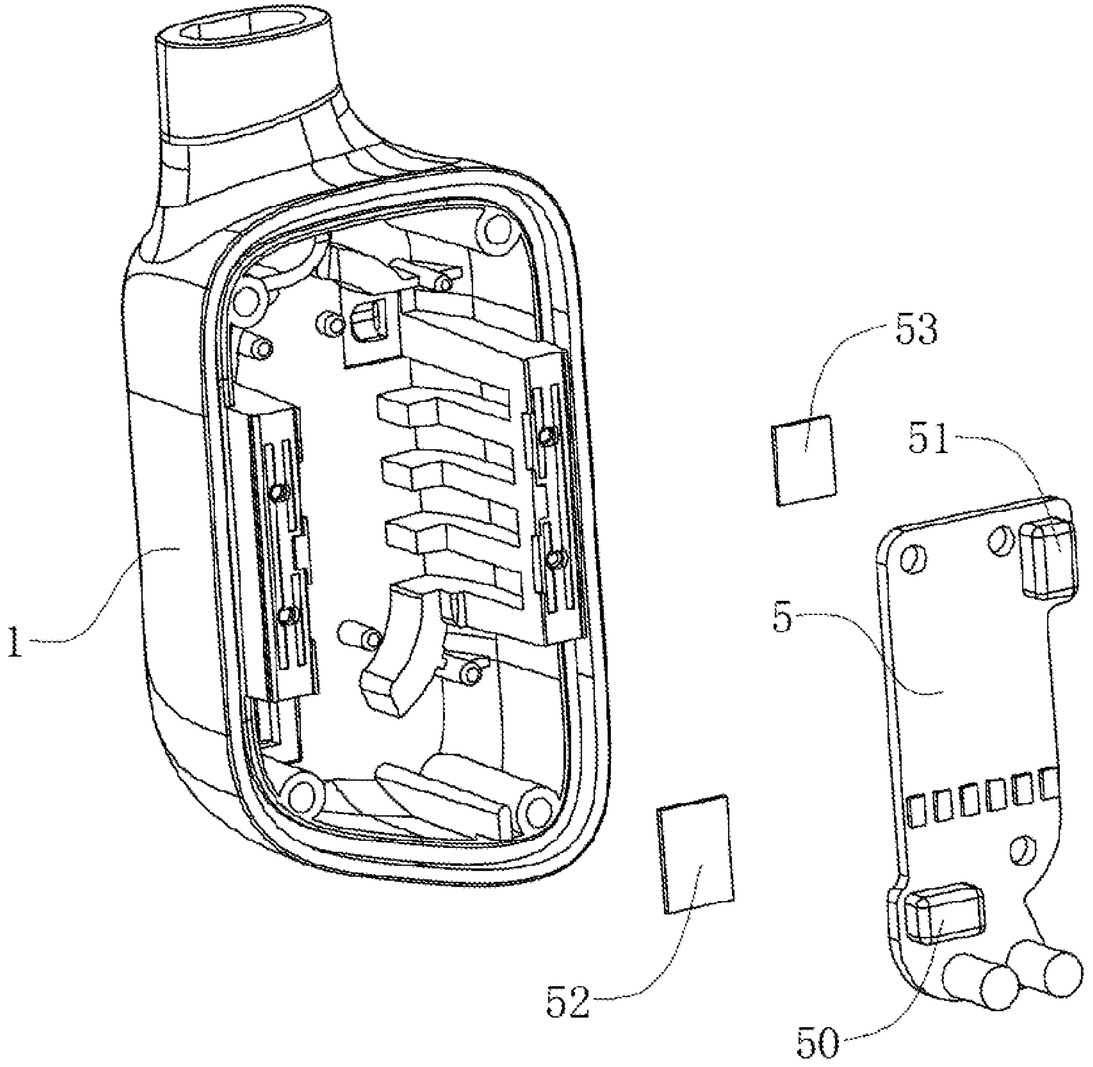
FIG. 19 is an exploded view of a case, a circuit board, a first waterproof and breathable membrane, and a second waterproof and breathable membrane according to an embodiment of the present application.

In order to make the bone conduction acoustic device have better waterproof performance, as shown in FIGS. 10 and 19, it also includes a first waterproof and breathable membrane 52 and a second waterproof and breathable membrane 53. The first waterproof and breathable membrane 52 and the second waterproof membrane 53 are attached to the inner wall of the case 1, wherein the first waterproof and breathable membrane 52 is used to seal the first microphone hole 12, and the second waterproof and breathable membrane 53 is used to seal the second microphone hole 13. Because the waterproof and breathable membrane has the characteristics of allowing gas to pass through but preventing liquid from passing, it can prevent external liquid from entering into the case 1 through the microphone hole without affecting sound transmission, which can protect the components inside the case 1 and improve the service life and reliability of the bone conduction acoustic device.

When the bone conduction acoustic device of the present application is in use, its cover 2 faces the user's head skin, generally abutting the user's skin near the temporal bone of the ear. In order to make it more comfortable to use, as shown in FIG. 2, FIG. 4, and FIG. 8, the cover 2 further includes a flexible layer 24 provided on the outside thereof. The flexible layer 24 may be made of a flexible material such as silicone, so as to make it more comfortable to touch.

Figure 20:
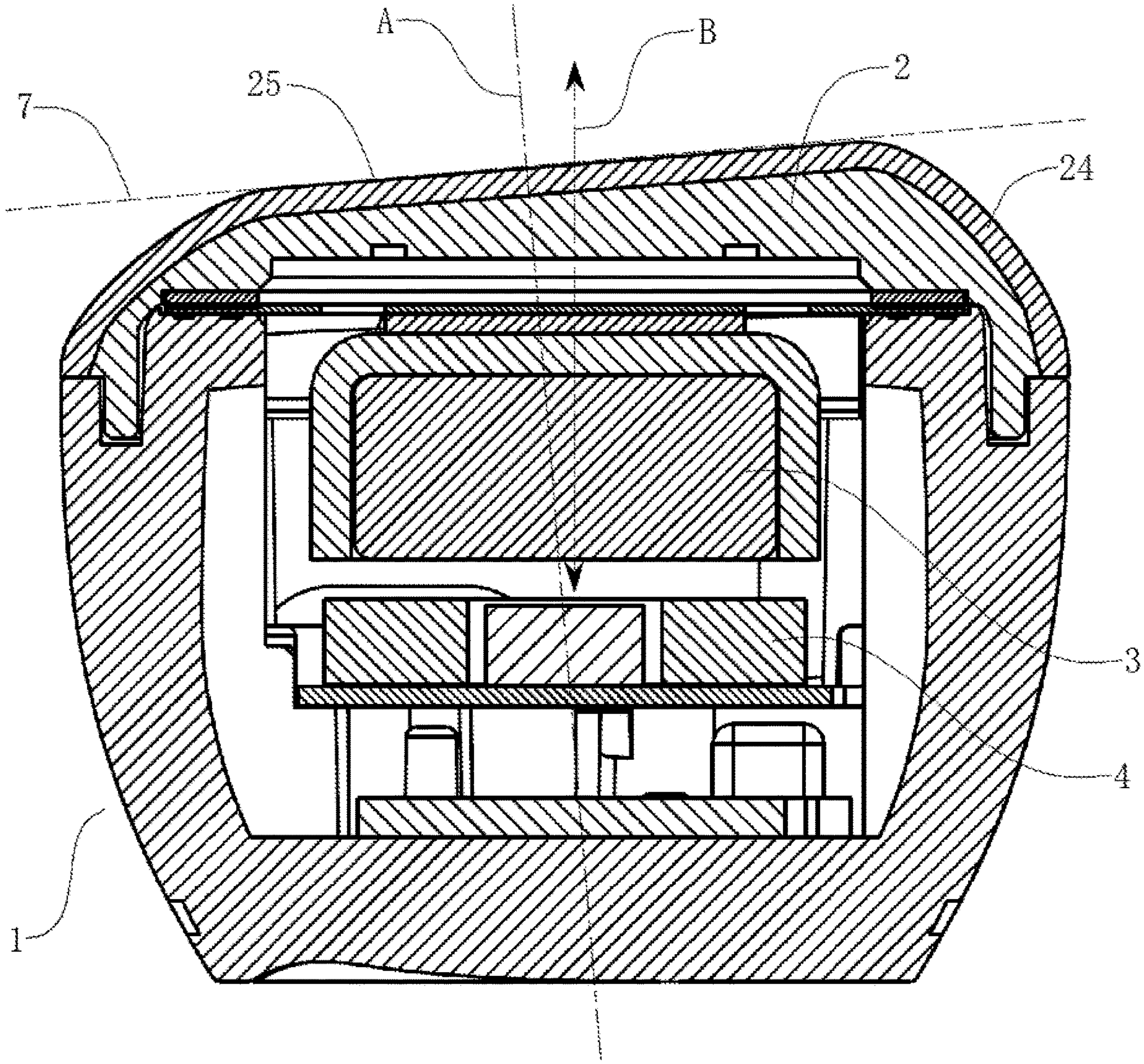
FIG. 20 is a schematic diagram of the bone conduction acoustic device collided with a human body part according to an embodiment of the present application.

As shown in FIG. 20, the cover 2 has a contact surface 25 for contacting the skin 7 of the user's head. When the cover 2 is provided with a flexible layer 24, the contact surface 25 is the surface of the flexible layer 24. The contact surface 25 has a normal line A, and the magnet assembly 3 has a vibration axis B and reciprocates along the vibration axis B when vibrating. As a preferred embodiment, the vibration axis B is perpendicular to the contact surface 25. At this time, the angle between the vibration axis B and the normal line A is 0°, vibration force applied on the human body by the magnet assembly 3 is largest, and its volume is also the largest. At this time, the human body feels the strongest low-frequency vibration. As another preferred embodiment, the vibration axis B and the normal line A are arranged obliquely, and the angle between the two is any value between 0° and 35° excluding 0°. It is understandable that the greater the angle, the greater the component force parallel to the skin 7 generated by the vibration force, and the smaller the component force perpendicular to the skin 7, at this time, the vibration sense is weakened, and the volume felt by the human body is lower; while the smaller the angle is, it's exactly the opposite. Therefore, it is further preferred that the angle is set to any value from 0° to 10° excluding 0°. At this time, it has a larger volume and can reduce a certain low-frequency vibration sense to achieve a better balance between the two and makes it more comfortable to use.

The realization of the angle is not limited. For example, the cover 2 can be set in a shape with a thick end and a thin end, so that the angle between the normal line A and the vibration axis B is greater than 0°.

Figure 21:
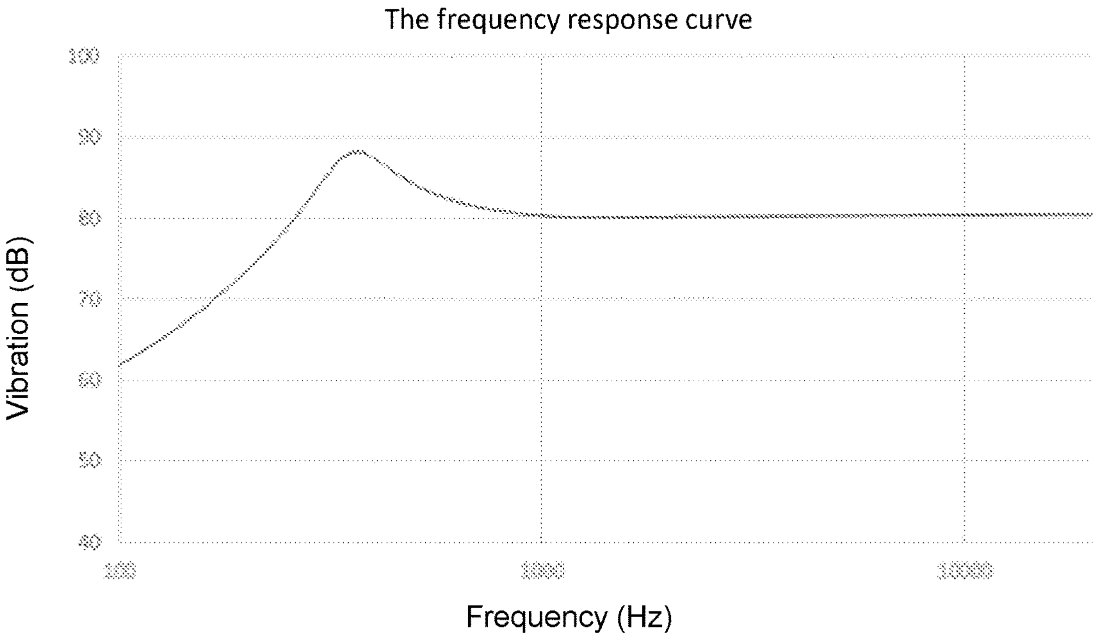
FIG. 21 is a graph of frequency response of a bone conduction headphones according to an embodiment of the present application.

As shown in FIG. 21, FIG. 21 shows the frequency response curve of a bone conduction acoustic device provided by the present application, wherein the horizontal axis is the vibration frequency, and the vertical axis is the vibration intensity of the bone conduction acoustic device. The vibration intensity mentioned here may be expressed as the vibration acceleration of the bone conduction acoustic device. Generally, in the frequency response range from 1000 Hz to 10000 Hz, the flatter the frequency response curve, the better the sound quality of bone conduction acoustic device. The structure of bone conduction acoustic device, the design of components, and material properties may all have an impact on the frequency response curve. Generally, the low frequency refers to the sound less than 500 Hz, the middle frequency refers to the sound in the range of 500 Hz to 4000 Hz, and the high frequency refers to the sound greater than 4000 Hz. As shown in FIG. 21, the frequency response curve of bone conduction acoustic device has a resonance peak in the low frequency region. The resonance peak in the low frequency region can be produced by the joint action of the flexure spring 30 and the fixed vibration component of the earphone (namely the magnet assembly 3).

Obviously, the bone conduction acoustic device of the present application is provided with the flexure spring 30 so that the resonance peak appears in the low frequency region. This makes the frequency response curve in the 1000 Hz~10000 Hz frequency response range flatter, which effectively improves the sound quality of bone conduction acoustic device. In addition, there is only one resonance peak in the low frequency region, and the sound quality of low frequency is better.

In order to further flatten the frequency response curve in the frequency response range of 1000 Hz to 10000 Hz, the Young's modulus of the case 1 and the cover 2 can be adjusted. Generally, under the condition of the same size, the greater the Young's modulus of material of the case 1 and cover 2, as the stiffness become greater, and the peak at the high frequency region of the frequency response curve of the bone conduction acoustic device may change towards the high frequency direction which is conducive to adjusting the peak of the high-frequency region to a higher frequency, thereby obtaining a flatter frequency response curve in the frequency response range of 1000 Hz to 10000 Hz, and improving the sound quality of bone conduction acoustic device. Furthermore, by adjusting the Young's modulus of the case 1 and the cover 2, the peaks in the high frequency region may be adjusted outside the hearing range of human ears.

The present application also provides a bone conduction earphone, which includes the bone conduction acoustic device as described above.

Figure 22:
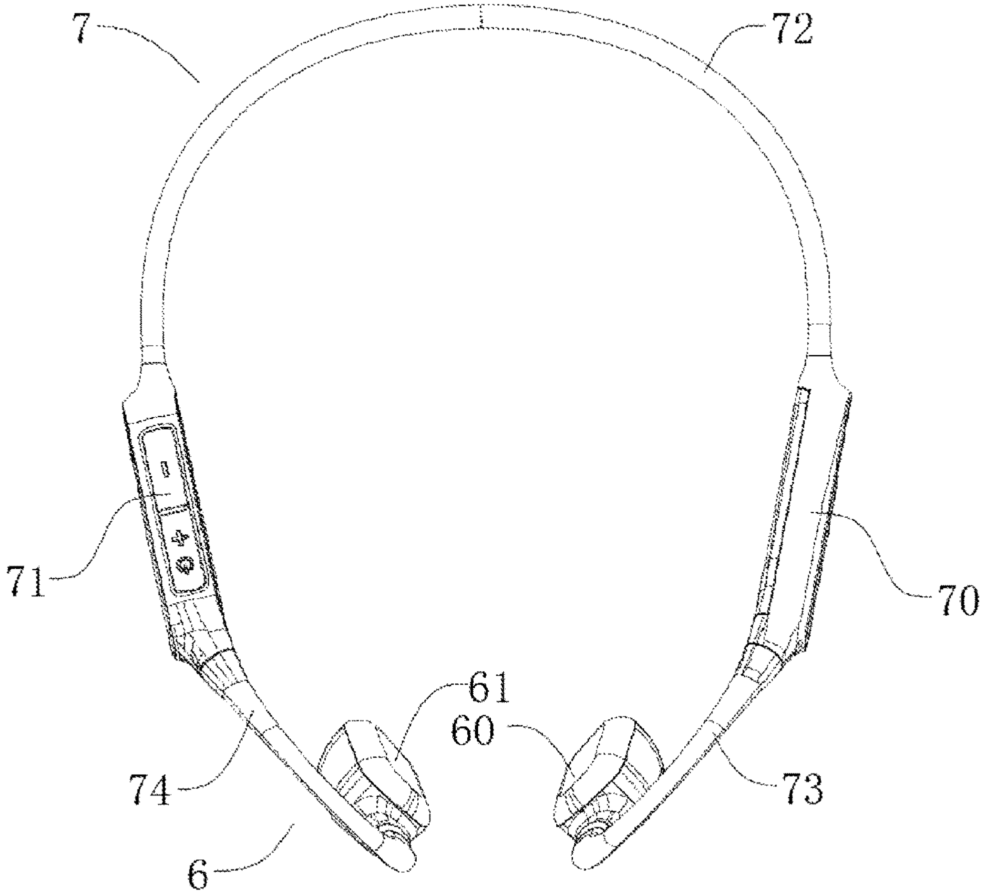
FIG. 22 is a schematic structural diagram of a bone conduction headphones according to an embodiment of the present application.

As a preferred embodiment, as shown in FIG. 22, the bone conduction earphone is a neck-worn bone conduction earphone, which includes two bone conduction acoustic devices, namely a left bone conduction acoustic device 60 corresponding to the left ear and a right bone conduction acoustic device 61 corresponding to the right ear. At the same time, the bone conduction earphones further include a battery compartment 70, a control compartment 71, a neckline 72 connected between the battery compartment 70 and the control compartment 71, a left ear hook 73 connected between the control compartment 71 and the left bone conduction acoustic device 60, and a right ear hook 74 connected between the battery compartment 70 and the right bone conduction acoustic device 61.

Among them, the neckline 72 is used to hang on the neck of the human body when it is worn, and the control compartment 71 has a main board electrically connected to two bone conduction acoustic devices for data processing and issuing control instructions. For example, it can control the volume of the bone conduction acoustic device, control the vibration of the bone conduction sound generating device and connection with terminals such as smart phones via Bluetooth, and so on. A power source is provided in the battery compartment 70 for powering electrical components such as the main board and the bone conduction acoustic device. The power source may be, for example, a lithium battery.

As a preferred embodiment, the left bone conduction acoustic device 60 and the right bone conduction acoustic device 61 of the bone conduction earphone have different structures. Specifically, the circuit board 5 of the left bone conduction acoustic device 60 is provided with a first microphone 50 and a second microphone 51. Correspondingly, a first microphone hole 12, a second microphone hole 13, a first waterproof and breathable membrane 52 and a second waterproof and breathable membrane 53 are provided on its case 1. The left bone conduction acoustic device 60 does not have a button assembly, so an avoidance through hole 140 is not provided on the case 1. While the right bone conduction acoustic device 61 includes a button assembly, and correspondingly, an avoidance through hole 140 is provided on its case 1. The right bone conduction acoustic device 61 does not include the first microphone 50 and the second microphone 51. Accordingly, the structures such as the first microphone hole 12, the second microphone hole 13, the first waterproof and breathable membrane 52 and the second waterproof and breathable membrane 53 are not provided on its case 1.

In this way, the bone conduction earphone may receive sound and reduce noise through the left bone conduction acoustic device 60, and is controlled by the right bone conduction acoustic device 61, its functions are more comprehensive and the functions are set separately which allows the left bone conduction acoustic device 60 and the right bone conduction acoustic device 61 to reduce the internal parts, so that the volume of each is smaller.

As a preferred embodiment, the thickness of the flexible layer 24 of bone conduction acoustic device ranges from 0.2 to 1 mm, preferably 0.3 to 0.6 mm, especially a thickness close to 0.4 to 0.5 mm is best. If the flexible layer 24 is too thin, for example, its thickness is 0.2 mm, the vibration of the part of the face in contact with the flexible layer 24 may be very strong, which will affect the user experience. If the flexible layer 24 is too thick, for example, its thickness is 1 mm, the vibration energy absorbed by the flexible layer 24 is too much, the vibration transmitted to the contact part of the face is greatly reduced, the sound quality of the voice heard by the user deteriorates, and the volume of the voice also decreases.

Figure 23:
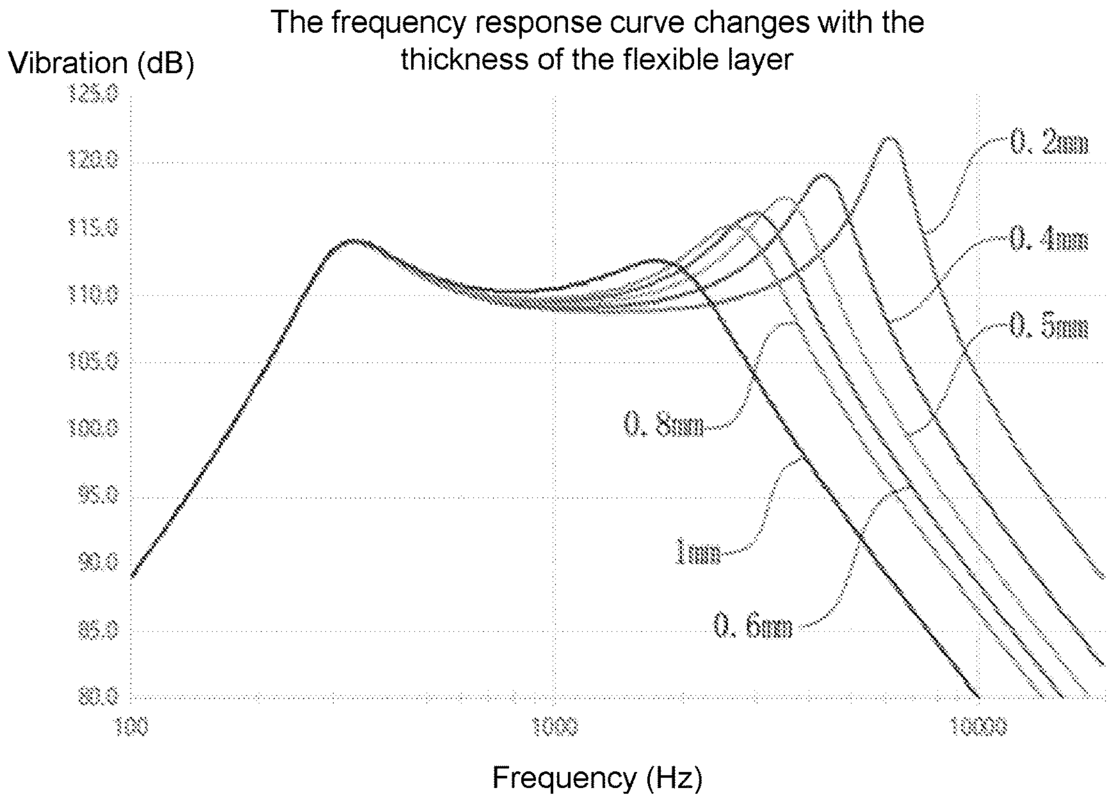
FIG. 23 is a graph showing the variation of the frequency response curve of a bone conduction headphones as a function of the thickness of the flexible layer according to an embodiment of the present application.
Figure 24:
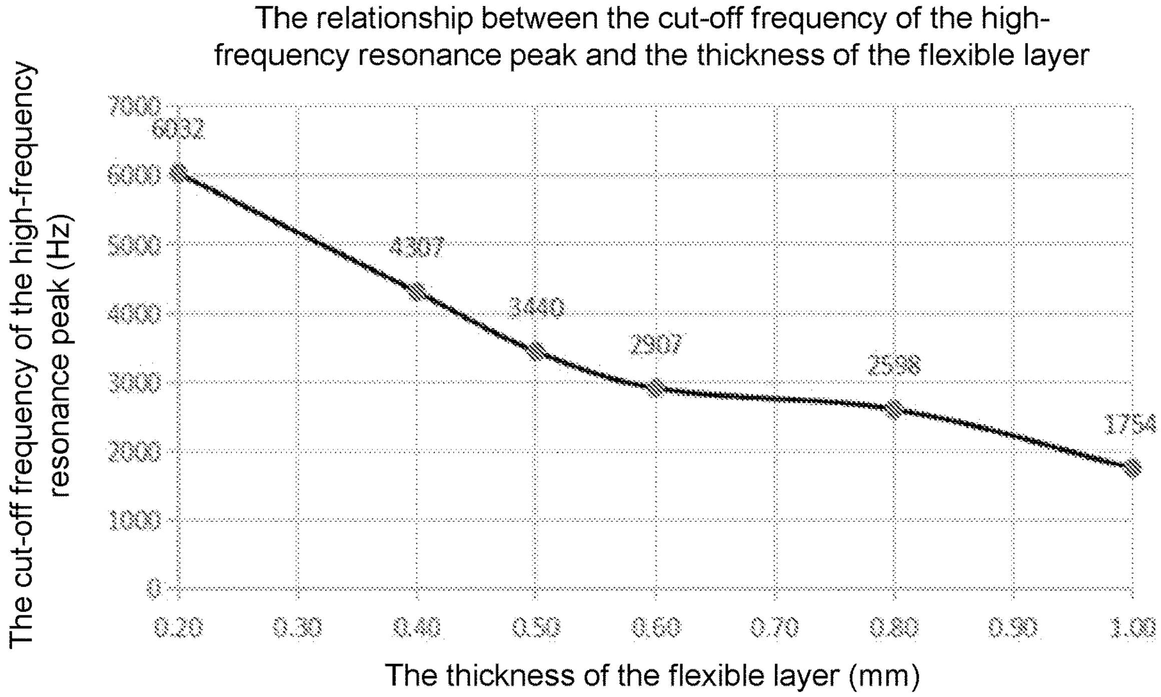
FIG. 24 is a diagram showing the relationship between the cut-off frequency of the high-frequency resonance peak in FIG. 23 and the thickness of the flexible layer.

Refer to FIG. 23 and FIG. 24, FIG. 23 is a frequency response curve diagram obtained by simulation when the thickness of the flexible layer 24 of the bone conduction earphone of an embodiment is changed, FIG. 24 shows the correspondence between the high frequency resonance peaks of the multiple frequency response curves in FIG. 23 and the thickness of the flexible layer. The frequency response curve of bone conduction earphones has a high-frequency resonance peak and a low-frequency resonance peak. The frequency difference between the low-frequency resonant peak and the high-frequency resonant peak is the bandwidth. When the low-frequency resonant peak is constant, the cut-off frequency of the high-frequency resonant peak reflects the size of the bandwidth. Generally speaking, the wider the bandwidth, the better the dynamic response, the greater the range of audible sounds, the richer the high-frequency details, the stronger the texture of some musical instruments in music, the more realistic the vocals, the clearer the sound levels, the more accurate the positioning, and the better the quality of the sound heard. According to FIG. 23 and FIG. 24, the flexible layer 24 has the widest bandwidth when the thickness is 0.2 mm, but at this time, the vibration sensation conducted by the earphone to the face contact position is the strongest (the equivalent sensitivity exceeds 120 dB), which is unacceptable to the human senses. The flexible layer 24 has the narrowest bandwidth when the thickness is 1 mm. At this time, the vibration from the earphone to the contact position of the face is the slightest (the equivalent sensitivity is lower than 115 dB), but the narrow bandwidth causes serious sound quality degradation and poor hearing. Through simulation and actual wearing, it is found that when the thickness of the flexible layer 24 is 0.4 mm~0.5 mm, the bandwidth is moderate, the sound quality is good, and the vibration sensation is also moderate at this time. Therefore, this thickness is used as the best thickness choice for the flexible layer 24 in the design of bone conduction earphones.

As a preferred embodiment, the Young's modulus of the case 1 and the cover 2 (not including the flexible layer 24) of the bone conduction acoustic device is ≥2 GPa. For example, it may be 2 GPa, 4 GPa, 8 GPa, 12 GPa, 20 GPa, 25 GPa, 35 GPa, or 76 GPa. It is understood that the Young's modulus of the case 1 and the cover 2 may be the same or different.

Figure 25:
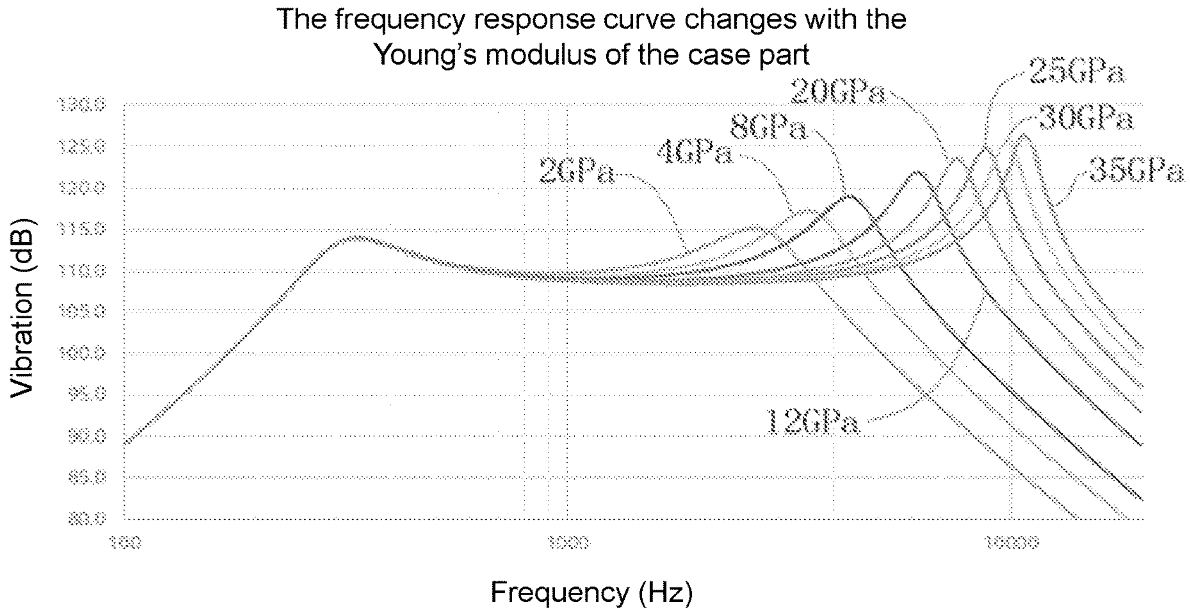
FIG. 25 is a graph showing the variation of the frequency response curve of a bone conduction headphones as a function of the Young's modulus of the case part according to an embodiment of the present application.

Further preferably, the Young's modulus of the case 1 and the cover 2 is any value between 8 GPa and 25 GPa. Referring to FIG. 25, FIG. 25 shows the frequency response curve diagram of the bone conduction earphone obtained by simulation when the case 1 and the cover 2 are made of materials with different Young's modulus. It can be seen from FIG. 25 that the material of the case part (case 1 and cover 2 (except the soft layer part)) of the bone conduction acoustic device has the best sound quality at 8 GPa to 25 GPa. This is because the bandwidth is too narrow when lower than 8 GPa, the sound quality is reduced, the sound is not clear enough and feels dry, and a lot of sound details are lost, the texture of the instrument is not good, the human voice is empty, the lack of sing voice friction, and the sound is too fake, the sound quality is significantly worse; while materials higher than 25 GPa tend to use denser materials such as high-density plastics or metal materials. Although the bandwidth is sufficient at this time, the use of high-density materials will increase the overall weight of the bone conduction earphones, which will finally affect the wearing experience of the user. Therefore, the case part (case 1 and cover 2 (except the soft layer part)) of the bone conduction acoustic device is selected to be made of a material with a Young's modulus of 8 GPa~25 GPa. At this time, the overall performance of the bone conduction earphones in terms of wearing experience, bandwidth, low-frequency and mid-high-frequency sensitivity, and earphone quality is the best.

Figure 26:
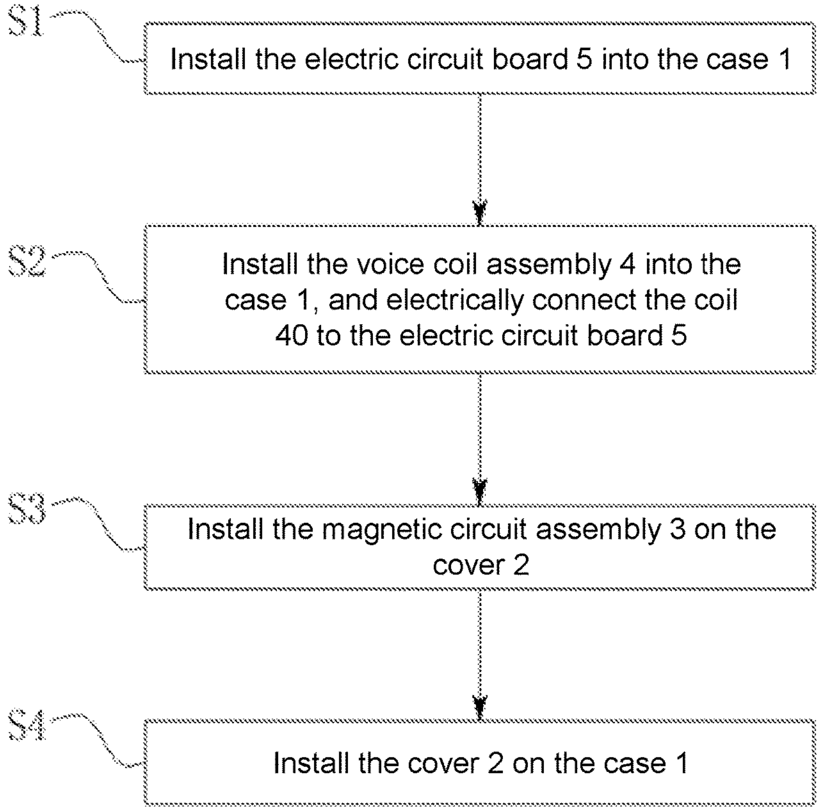
FIG. 26 is a flowchart of the steps of assembling the bone conduction acoustic device in the present application.

Referring to FIG. 26, the present application also proposes a method for assembling bone conduction acoustic device, which includes the following steps:

S1. installing the circuit board 5 into the case 1.

S2. installing the voice coil assembly 4 in the case 1, and electrically connecting the coil 40 with the circuit board 5.

S3. installing the magnet assembly 3 on the cover 2.

S4. installing the cover 2 on the case$_1$.

Obviously, in S2, the voice coil assembly 4 has been assembled before being installed in the case 1, so that it can be putted into the case 1 as a whole in step S2. Similarly, the magnet assembly 3 in step S3 has also been assembled before being installed on the cover 2, so that it can be mounted on the cover 2 as a whole in step S3.

In step S1, the step of installing the circuit board 5 in the case 1 includes the following steps: S10. mounting the circuit board 5 to the bottom of the case 1 (specifically on the base case portion 14) along the third positioning post 16; S11. heat-staking the third positioning post 16 by a heat-staking device to fix the circuit board 5 in the case 1.

In step S2, the step of installing the voice coil assembly 4 in the case 1 includes the following steps: S20. mounting the first magnetically conductive part 41 to the case 1 (specifically on the supporting boss 17 of the case 1) along the fourth positioning post 173; Step S21. heat-staking the fourth positioning post 173 by a heat-staking device to fix the first magnetically conductive part 41 on the supporting boss 17.

In step S3, the step of mounting the magnet assembly 3 on the cover 2 includes the following steps: S30. attaching double-sided tape to the connecting surface 20 of the cover 2 or the outer ring body 301 of the flexure spring 30; S31. attaching the flexure spring 30 to the connecting surface 20.

In step S4, the step of installing the cover 2 on the case 1 includes the following steps: S40. applying glue on the annular groove 150 of the case 1 and/or on the annular boss 22 of the cover 2, and applying glue on the support seat 152; S41. inserting the annular boss 22 into the annular groove 150, and the outer ring body 301 of the flexure spring 30 is embedded in the position limiting groove 1520 of the support base 152, so that the cover 2 and the case 1 are adhered, and the flexure spring 30 and the support base 152 are adhered.

For the left bone conduction acoustic device 60, since it includes the first microphone 50 and the second microphone 51, it also includes the following steps before installing the circuit board 5 in step S1: attaching the first waterproof and breathable membrane 52 and the second waterproof and breathable membrane 53 to the positions in the case 1 corresponding to the first microphone hole 12 and the second microphone hole 13. In addition, it is easy to understand that when the circuit board 5 is installed in step S1, the first microphone 50 and the second microphone 51 need to be aligned with the first microphone hole 12 and the second microphone hole 13, respectively; and the lead wire of the coil 40 is specifically connected to the terminal 5*a* of the circuit board 5.

As for the right bone conduction acoustic device 61, since it includes a button sub-assembly, it further includes the following step before mounting the circuit board 5 in step S1: mounting the flexible pad 574 connected with the pressing part 575 to the outer surface of the base case portion 14, and then connecting the pressing panel 57 to the outer surface of the base case portion 14.

The present application has at least the following advantages:

1. By setting the magnet assembly to be connected to the cover and the voice coil assembly to be connected to the case, when the bone conduction acoustic device of the present application is installed, it is only necessary to install the circuit board and the voice coil assembly in the housing first, and then install the cover connected with the magnet assembly to the housing to complete the installation. The overall structure is simpler and more compact, assembly is more convenient.

2. By installing the circuit board on the base case portion of the case and between the voice coil assembly and the base case portion, the internal space of the case can be fully utilized. And the circuit board and the voice coil assembly can be installed in sequence, making the installation more convenient;

3. By providing the first microphone for receiving the user's voice and the second microphone for receiving the ambient sound, noise can be effectively reduced according to the ambient sound, and the sound quality and use experience of the earphone can be improved; in addition, the case is provided with a waterproof and breathable membrane that seals the first microphone hole and the second microphone hole, which is beneficial to prevent liquid from entering into the case and damaging the internal electrical components, thereby improving the service life and reliability of the bone conduction acoustic device.

The foregoing is only a specific embodiment of the present application, and any other improvements made based on the concept of the present application are deemed to be within the protection scope of the present application.

What is claimed is:

1. A bone conduction acoustic device, comprising:

a case, including a base case portion and a side case portion connected with the base case portion, a cavity with an opening at one end is formed between the base case portion and the side case portion;

a cover, connected to the side case portion and sealing the opening, wherein the cover has a contact surface for contacting a skin of a user's head;

a magnet assembly, connected to the cover, and located in the cavity;

a voice coil assembly, arranged in the cavity, and arranged opposite to the magnet assembly for driving the magnet assembly to vibrate; and a circuit board, arranged in the cavity, and electrically connected to the voice coil assembly, the circuit board is located between the base case portion and the voice coil assembly.

2. The bone conduction acoustic device of claim 1, wherein the voice coil assembly comprise a coil, a first magnetically conductive part and a first magnetic part, and the coil and the first magnetic part are both connected to a side of the first magnetically conductive part close to the magnet assembly;

the magnet assembly comprises a flexure spring connected with the cover, a second magnetically conductive part connected with the flexure spring, and a second magnetic part connected to a side of the second magnetically conductive part close to the voice coil assembly;

the coil generates an electromagnetic field with a changing polarity when the coil current is switched on, the electromagnetic field can generate a varying attractive force and a repulsive force on the second magnetic part, and the second magnetic part drives the flexure spring to vibrate back and forth under the attractive force and the repulsive force.

3. The bone conduction acoustic device of claim 2, wherein the first magnetic part and the second magnetic part are arranged opposite to each other in the same pole, and there is a first attractive force between the first magnetic part and the second magnetically conductive part, and there is a second attractive force between the second magnetic part and the first magnetically conductive part; when the coil current is switched off, the resultant force of the first attractive force and the second attractive force is equal to the repulsive force between the first magnetic part and the second magnetic part.

4. The bone conduction acoustic device of claim 2, wherein the coil is ring-shaped, and the first magnetic part is disposed in the central hole of the coil;

and the gap between the outer peripheral surface of the first magnetic part and the central hole is greater than 0.05 mm, and the height of the first magnetic part is not higher than the height of the coil.

5. The bone conduction acoustic device of claim 2, wherein both the first magnetically conductive part and the second magnetically conductive part are plate-shaped; or, each of the first and second magnetically conductive parts includes a plate portion and a ring portion protruding from the plate portion; or, one of the first magnetically conductive part and the second magnetically conductive part is plate-shaped, and the other includes a plate portion and a ring portion protruding from the plate portion.

6. The bone conduction acoustic device of claim 2, wherein the first magnetic conductive part is provided with an avoidance slot or an avoidance hole for the lead wire of the coil to pass through.

7. The bone conduction acoustic device of claim 2, wherein the flexure spring includes a base body, an outer ring body surrounding the base body, and a plurality of connecting arms connected between the base body and the outer ring body, and the outer ring body is connected to the cover, and the base body is connected with the second magnetically conductive part;

the connecting arms are suspended in the air and are not in contact with the second magnetically conductive part;

the magnet assembly further includes a low-frequency adjustment plate connected between the base body and the second magnetically conductive part, and the low-frequency adjustment plate is not in contact with the connecting arms.

8. The bone conduction acoustic device of claim 7, wherein the cover is provided with an avoidance hole for avoiding the movement of the main body and the connecting arm.

9. The bone conduction acoustic device of claim 7, wherein the cover includes a connecting surface connected to the outer ring body, one of the connecting surface and the outer ring body is provided with a convex positioning block, and the other is provided with a positioning slot or a positioning hole mated with the positioning block.

10. The bone conduction acoustic device of claim 2, wherein the side case portion is provided with a wiring hole connected with the cavity, and the circuit board is electrically connected to an external circuit through the wiring of the wiring hole.

11. The bone conduction acoustic device of claim 10, wherein the case further includes a support seat connected with the side case portion, and the support seat is provided with a position limiting groove, and the flexure spring is partially fit to the position limiting groove.

12. The bone conduction acoustic device of claim 11, wherein the case further includes a reinforcing rib connected between the support seat, and the base case portion and/or the side case portion;

the number of the reinforcing ribs is one; or, the number of the reinforcement ribs is multiple, and the multiple reinforcement ribs are arranged at intervals.

13. The bone conduction acoustic device of claim 10, wherein the case further includes a supporting boss located in the cavity, and the first magnetically conductive part is mounted on the supporting boss, and an installation space for accommodating the circuit board is formed between the first magnetically conductive part and the base case portion.

14. The bone conduction acoustic device of claim 1, wherein the surface of the cover in contact with the user's body has a normal line A;

the angle between the vibration axis B of the magnet assembly and the normal line A is any value between 0° and 35°;

preferably, the angle is any value between 0° and 10°.

15. The bone conduction acoustic device of claim 1, wherein the cover includes a flexible layer for contact with the user's skin;

the thickness of the flexible layer is 0.2 mm~1 mm;

preferably, the thickness of the flexible layer is 0.3 mm~0.6 mm;

further preferred, the thickness of the flexible layer is 0.4 mm~0.5 mm.

16. The bone conduction acoustic device of claim 1, wherein the circuit board includes a first microphone for receiving the user's voice and a second microphone for receiving ambient sound; the case is provided with a first microphone hole corresponding to the first microphone and a second microphone hole corresponding to the second microphone, and the distance between the center of the first microphone hole and the center of the second microphone hole is not less than 15 mm.

17. The bone conduction acoustic device of claim 16, wherein the positive directions of the axes of the first microphone hole and the second microphone hole are not blocked by the auricle;

the angle between the positive direction of the axis of the first microphone hole and the second microphone hole is not less than 70°;

preferably, the angle between the positive direction of the axis of the first microphone hole and the second microphone hole is 90°.

18. The bone conduction acoustic device of claim 16, further comprising a first waterproof and breathable membrane and a second waterproof and breathable membrane, the first waterproof and breathable membrane sealing the first microphone hole, and the second waterproof and breathable membrane sealing the second microphone hole.

19. The bone conduction acoustic device of claim 1, wherein the bone conduction acoustic device includes a button assembly that includes a switch provided on the circuit board and a pressing panel connected to the outer surface of the case for pressing to trigger the switch.

20. The bone conduction acoustic device of claim 19, wherein the pressing panel includes a base connected to the case and a pressing part connected to the base, one end of the pressing part is connected to the base and the other end is suspended, the pressing portion includes a bump corresponding to the switch position and protruding toward the switch, and the case is provided with an avoidance through hole corresponding to the switch position.

21. The bone conduction acoustic device of claim 20, wherein the button assembly further includes a flexible pad that seals the avoidance through hole and a pressing part located between the flexible pad and the switch.

22. A bone conduction earphone, comprising a bone conduction acoustic device, and the bone conduction acoustic device comprising:

a case, including a base case portion and a side case portion connected with the base case portion, a cavity with an opening at one end is formed between the base case portion and the side case portion;

a cover, connected to the side case portion and sealing the opening, wherein the cover has a contact surface for contacting a skin of a user's head;

a magnet assembly, connected to the cover, and located in the cavity;

a voice coil assembly, arranged in the cavity, and arranged opposite to the magnet assembly for driving the magnet assembly to vibrate; and a circuit board, arranged in the cavity, and electrically connected to the voice coil assembly, the circuit board is located between the base case portion and the voice coil assembly.

* * * * *